(12) United States Patent
Foti et al.

(10) Patent No.: US 8,527,942 B2
(45) Date of Patent: Sep. 3, 2013

(54) ENUMERATION CLASSES

(75) Inventors: David Foti, Tolland, CT (US); Paul Jackson, Southborough, MA (US)

(73) Assignee: The Mathworks, Inc., Natick, MA (US)

( * ) Notice: Subject to any disclaimer, the term of this patent is extended or adjusted under 35 U.S.C. 154(b) by 1133 days.

(21) Appl. No.: 12/351,621

(22) Filed: Jan. 9, 2009

(65) Prior Publication Data
US 2009/0183139 A1 Jul. 16, 2009

Related U.S. Application Data

(60) Provisional application No. 61/020,685, filed on Jan. 11, 2008.

(51) Int. Cl.
*G06F 9/44* (2006.01)
(52) U.S. Cl.
USPC ............ 717/106; 717/107; 717/108; 717/116
(58) Field of Classification Search
None
See application file for complete search history.

(56) References Cited

U.S. PATENT DOCUMENTS

| | | | |
|---|---|---|---|
| 6,842,905 B2 | 1/2005 | Knutson et al. | |
| 7,203,774 B1 | 4/2007 | Zhou et al. | |
| 7,222,331 B2 * | 5/2007 | de Jong | 717/106 |
| 7,263,687 B2 * | 8/2007 | Bloch et al. | 717/116 |
| 7,318,215 B1 * | 1/2008 | Krishnan et al. | 717/106 |
| 7,360,202 B1 * | 4/2008 | Seshadri et al. | 717/106 |
| 7,665,062 B1 * | 2/2010 | Bauer et al. | 717/108 |
| 8,086,998 B2 * | 12/2011 | Bansal et al. | 717/108 |
| 2002/0178435 A1 | 11/2002 | Allison | |
| 2003/0107595 A1 * | 6/2003 | Ciolfi | 345/762 |
| 2004/0049764 A1 * | 3/2004 | Bloch et al. | 717/116 |
| 2004/0143827 A1 | 7/2004 | De Jong | |
| 2004/0205710 A1 | 10/2004 | Kawai et al. | |
| 2005/0071801 A1 | 3/2005 | Jesse et al. | |
| 2005/0183058 A1 * | 8/2005 | Meijer et al. | 717/100 |
| 2005/0289510 A1 * | 12/2005 | Illowsky et al. | 717/107 |
| 2006/0070030 A1 | 3/2006 | Laborczfalvi et al. | |
| 2006/0206860 A1 | 9/2006 | Dardinski et al. | |
| 2006/0206866 A1 | 9/2006 | Eldrige et al. | |
| 2007/0006125 A1 | 1/2007 | Gutberlet et al. | |
| 2007/0288892 A1 * | 12/2007 | Foti | 717/114 |
| 2010/0306739 A1 * | 12/2010 | Schneider | 717/116 |

OTHER PUBLICATIONS

Carlstrom et al., Transactional collection classes, Mar. 2007, 12 pages.*
Fung et al., Cost-driven vertical class partitioning for methods in object oriented databases, Oct. 2003, 24 pages.*
Notification of Transmittal of the International Search Report and the Written Opinion of the International Searching Authority, or the Declaration corresponding to PCT/US 09/30637, Mar. 2, 2009, 8 pages.
C# Language Reference: enum (C# Reference); msdn, 2007 Microsoft Corporation, retrieved online at: http://msdn2.microsoft.com/en-us/library/sbbt4032(VS.80,d=printer).aspx, printed Nov. 27, 2007, 4 pages.

(Continued)

*Primary Examiner* — Thuy Dao
(74) *Attorney, Agent, or Firm* — Harrity & Harrity, LLP

(57) ABSTRACT

In an embodiment, a technique for acquiring a class definition of a class, the class associated with an enumeration, the enumeration enumerating a partial list of instances of the class; generating a data structure based on the class definition, the data structure associating one or more identifiers with an instance enumerated in the enumeration; and storing the data structure in a computer storage.

46 Claims, 16 Drawing Sheets

(56) References Cited

OTHER PUBLICATIONS

C# Language Reference: enum (C# Reference); msdn, 2009 Microsoft Corporation, retrieved online at: http://msdn.microsoft.com/en-us/library/sbbt4032(VS.80).aspx, printed Jan. 19, 2009, 3 pages.

.NET Framework Class Library: Enum Class; msdn, 2008 Microsoft Corporation, retrieved online at: http://msdn.microsoft.com/en-us/library/system.enum(VS.71,printer).aspx, printed Jan. 4, 2008, 4 pages.

.NET Framework Class Library: Enum Class; msdn, 2008 Microsoft Corporation, retrieved online at: http://msdn2.microsoft.com/en-us/library/system.enum(printer).aspx, printed Jan. 4, 2008, 7 pages.

.NET Framework Class Library: Enum Constructor; msdn, 2008 Microsoft Corporation, retrieved online at: http://msdn.microsoft.com/en-us/library/system.enum.enum(printer).aspx, printed Jan. 4, 2008, 2 pages.

.NET Framework Class Library: Enum Methods; msdn, 2008 Microsoft Corporation, retrieved online at: http://msdn.microsoft.com/en-us/library/system.enum_methods(printer).aspx, printed Jan. 4, 2008, 4 pages.

Enumerated type; retrieved online at: http://en.wikipedia.org/wiki/Enumerated_type, printed Dec. 19, 2007, 6 pages.

Enums; retrieved online at: http://java.sun.com/j2se/1.5.0/docs/guide/language/enums.html, printed Nov. 27, 2007, 6 pages.

John, Karl-Heinz et al.: "IEC61131-3: Programming Industrial Automation Systems. Concepts and Programming Languages, Requirements for Programming Systems, Aids to Decision-Making Tools"; Springer-Verlag Berlin Heidelberg 2001, 35 pages.

System.Enum Class, retrieved online at: http://www.gnu.org/software/dotgnu/pnetlib-doc/System/Enum.html, printed Jan. 4, 2008, 17 pages.

\* cited by examiner

500

510 —— CLASSDEF (ENUMERATION) STATES < INT32
512 ———— ENUMERATION
514 ————— HIGH(100)
516 ————— MEDIUM(50)
518 ————— LOW(1)
520 ———— END

522 —— END

```
610 ── CLASSDEF COLOR
612 ──       PROPERTIES
614 ──           RED = 0;
616 ──           GREEN = 0;
618 ──           BLUE = 0;
620 ──       END

622 ──       METHODS
624 ──           FUNCTION C = COLOR(R, G, B)
626 ──               C.RED = R;
628 ──               C.GREEN = G;
630 ──               C.BLUE = B;
632 ──           END
634 ──       END

636 ──       ENUMERATION
              RED       (1, 0, 0);
              GREEN     (0, 1, 0);
              BLUE      (0, 0, 1);
              YELLOW    (1, 1, 0);
638 ──        ORANGE    (1, .5, 0);
              VIOLET    (1, 0, 1);
              BLACK     (0, 0, 0);
              WHITE     (1, 1, 1);

640 ──       END
642 ── END
```
⎫
⎬ 600
⎭

```
                    COMMAND LINE

660 ──   >> RC = COLOR.RED
662 ──   >>CLASS(RC)
664 ──   ANS = COLOR
```

```
710 —— CLASSDEF COLOR
712 ——       PROPERTIES
714 ——           RED = 0;
716 ——           GREEN = 0;
718 ——           BLUE = 0;
720 ——       END

722 ——       METHODS
724 ——           FUNCTION C = COLOR(R, G, B)
726 ——               C.RED = R;
728 ——               C.GREEN = G;
730 ——               C.BLUE = B;
732 ——           END
734 ——       END

736 ——       ENUMERATION
                 RED      (1, 0, 0);
                 GREEN    (0, 1, 0);
                 BLUE     (0, 0, 1);
                 YELLOW   (1, 1, 0);
                 ORANGE   (1, .5, 0);
                 VIOLET   (1, 0, 1);
                 BLACK    (0, 0, 0);
                 WHITE    (1, 1, 1);
740 ——       END

742 ——       ENUMERATION (ACCESS=PRIVATE)
744 ——           CYAN     (0, 1, 1);
746 ——           MAGENTA  (1, .5, 1);
748 ——       END

750 ——       ENUMERATION (DEFAULT)
752 ——           RED;
754 ——       END

756 —— END
```

```
CLASSDEF COLOR
    PROPERTIES
        RED = 0;
        GREEN = 0;
        BLUE = 0;
    END

METHODS
        FUNCTION C = COLOR(R, G, B)
            C.RED = R;
            C.GREEN = G;
            C.BLUE = B;
        END

770 ──────  FUNCTION D = GET_DEFAULT
772 ────────────  D = RED;
774 ──────  END

END

ENUMERATION
        RED       (1, 0, 0);
        GREEN     (0, 1, 0);
        BLUE      (0, 0, 1);
        YELLOW    (1, 1, 0);
        ORANGE    (1, .5, 0);
        VIOLET    (1, 0, 1);
        BLACK     (0, 0, 0);
        WHITE     (1, 1, 1);
    END

ENUMERATION (ACCESS=PRIVATE)
        CYAN      (0, 1, 1);
        MAGENTA   (1, .5, 1);
    END

END
```

FIG. 7B

```
810 —— CLASSDEF (ENUMERATION) ONOFF < LOGICAL
812 ——————— ENUMERATION
814 ——————————— OFF  (0);
816 ——————————— ON   (1);
818 ——————————— NO   (0);
820 ——————————— YES  (1);
822 ——————— END
824 —— END
```
⎫
⎬ 800
⎭

```
                    COMMAND LINE

860 —— >> ONOFF 1
862 ———— ANS=ON
```

FIG. 8

ENUMERATION CLASSES

RELATED APPLICATIONS

This application claims the benefit of U.S. Provisional Application No. 61/020,685, titled "ENUMERATION CLASSES", which was filed on Jan. 11, 2008 and which is hereby incorporated by reference as though fully set forth herein.

BACKGROUND

Many computer programs may contain one or more enumerations. The enumerations may define a finite set of named constants that are bound to unique values. The finite set of named constants may be called an enumeration list. The set of named constants may be said to define the enumeration.

In some computer programs, the named constants may be bound to values that are represented by an integral data type. The integral data type may be referred to as an underlying type of the enumeration. For example, in some computer programs, an integer is used to represent values bound to named constants. Here the underlying type of the enumeration is an integer.

The values associated with the named constants may start at a predefined value (which in some cases may be specified) and increment by some value (e.g., one) for each named constant in the enumeration list. Thus, for example, if the starting value is zero and the increment is one, the first named constant in an enumeration list would be associated with zero, the second named constant would be associated with one, the third named constant would be associated with two and so on.

BRIEF DESCRIPTION OF THE DRAWINGS

The accompanying drawings, which are incorporated in and constitute a part of this specification, illustrate one or more embodiments of the invention and, together with the description below, explain the invention. In the drawings.

FIG. 6 illustrates an example of a class definition of a class having an enumeration that enumerates a partial list of instances of the class;

FIGS. 7A-B illustrate examples of class definitions of a class having multiple enumerations, attributes associated with instances enumerated by the multiple enumerations, and default instances;

FIG. 8 illustrates an example of a class definition of an enumeration class having an instance associated with multiple identifiers;

DESCRIPTION

In an embodiment, one or more computer-readable media may comprise one or more computer-executable instructions for (1) acquiring a class definition of a class, wherein the class is associated with an enumeration and the enumeration enumerates one or more instances of the class; (2) transform the acquired class definition into data that represents the class definition; and storing the data in a storage. As will be described below, the data may be organized as a tree-like structure (e.g., a hierarchical tree) that contains one or more nodes that represent one or more instances of the enumeration. Also, as will be described further below, the data may include additional nodes that represent one or more identifiers associated with the instances.

Figure 1:
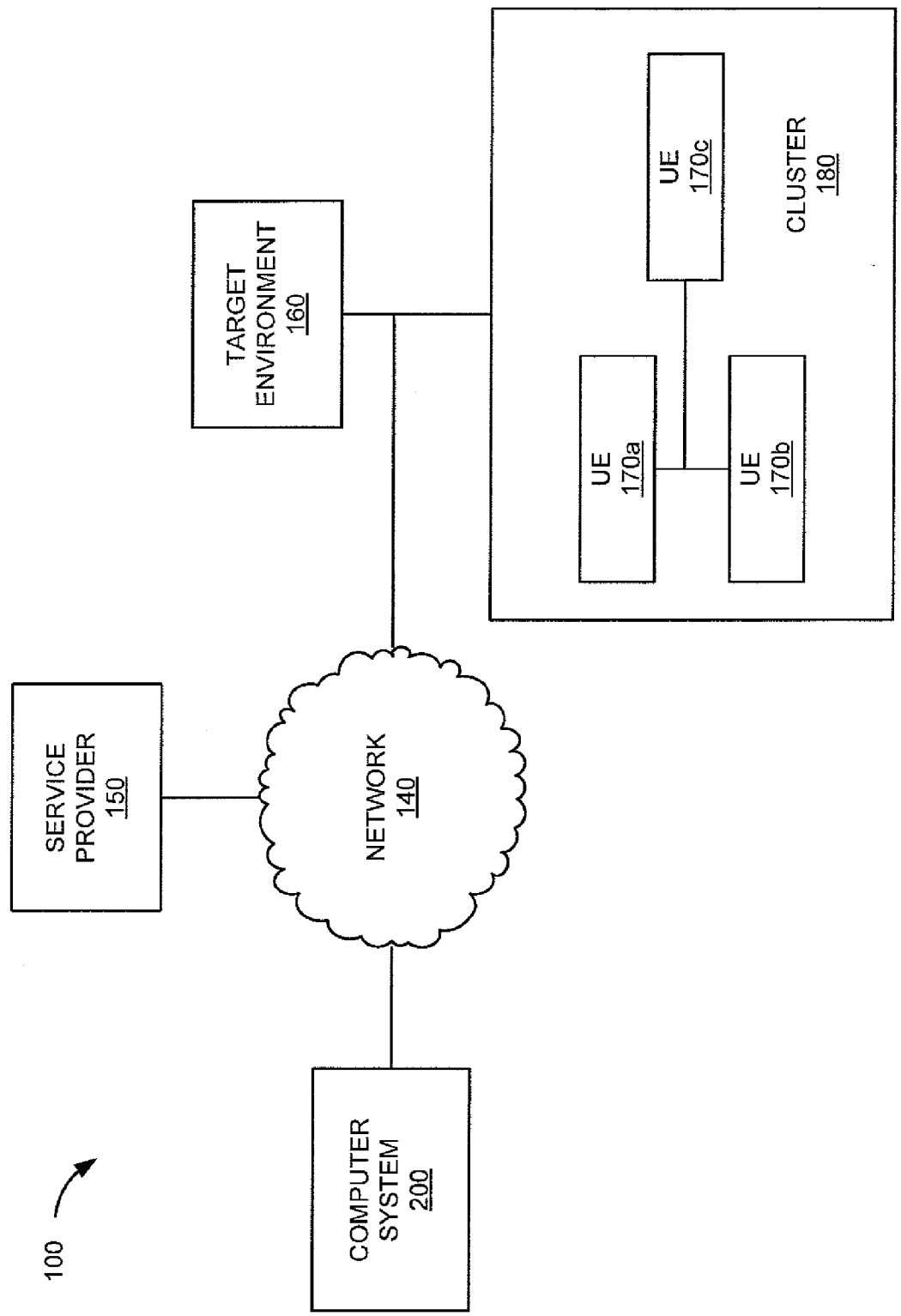
FIG. 1 illustrates an example of a distributed environment that may be configured to practice one or more embodiments of the invention.

FIG. 1 illustrates an example of a distributed environment 100 that may be configured to practice one or more embodiments of the invention. Referring to FIG. 1, the distributed environment 100 may comprise one or more entities, such as, a network 140, a service provider 150, a target environment 160, a cluster 180, and a computer system 200.

The network 140 may be a communications network that is capable of exchanging information (e.g., data) between entities associated with the network 140, such as, for example, the computer system 200, the service provider 150, the target environment 160, and the cluster 180. The exchanged information may be encapsulated (e.g., in a packet) or unencapsulated. Implementations of the network 140 may include local area networks (LANs), metropolitan area networks (MANs), wide-area networks (WANs), etc. Information may be exchanged between entities using one or more network protocols, which may include, but are not limited to, the Internet Protocol (IP), the User Datagram Protocol (UDP), the Transport Control Protocol (TCP), the Asynchronous Transfer Mode (ATM) protocol, the Synchronous Optical Network (SONET) protocol, the Ethernet protocol, etc.

The network 140 may comprise various network devices, such as routers, switches, firewalls, servers, etc. Portions of the network 140 may be wired (e.g., using wired conductors, optical fibers, etc.) and/or wireless (e.g., using free-space optical (FSO), radio frequency (RF), acoustic transmission paths, etc.). Portions of the network 140 may include a substantially open public network, such as the Internet. Portions of the network 140 may include a more restricted network, such as a virtual private network (VPN), etc. It should be noted that implementations of networks and/or devices operating on networks described herein are not limited with regards to information carried by the networks, protocols used in the networks, the architecture/configuration of the networks, etc.

The service provider 150 may include logic (e.g., hardware, software, etc.) that makes a service available to another device in the distributed environment 100. The service provider 150 may include a server operated by an entity (e.g., an individual, a corporation, an educational institution, a government agency, etc.) that provides one or more services to a destination, such as computer system 200. The services may include software containing computer-executable instructions that may be executed, in whole or in part, by a destination, by the service provider 150 on behalf of the destination, or some combination thereof. The services may be configured to process computer programs in whole or in part on behalf of another entity in the network 140. The computer programs may contain one or more class definitions that may include one or more enumerations. A class definition may be used in a computer program to define a class.

The target environment 160 may include logic configured to provide an environment for executing computer programs that may be generated and/or processed by entities contained in the distributed environment 100. These computer programs may include executable software (e.g., an executable model) that is configured to execute on the target environment 160. Examples of the target environment 160 may include, but are not limited to, embedded systems, in-circuit emulators (ICEs), personal computers, etc.

The cluster 180 may include one or more units of execution (UEs) 170 that may perform processing on behalf of the computer system 200 and/or another entity, such as service provider 150. For example, in an embodiment the cluster 180 may parallel process one or more computer programs that contain one or more class definitions that include one or more enumerations. The UEs 170 may reside on a single device or chip or on multiple devices or chips. For example, the UEs 170 may be implemented in a single application specific integrated circuit (ASIC) or in multiple ASICs. Likewise, the UEs 170 may be implemented in a single computer system or multiple computer systems. Other examples of UEs 170 may include field programmable gate arrays (FPGAs), complex programmable logic devices (CPLDs), application specific instruction-set processors (ASIPs), microprocessors, etc.

Figure 2:
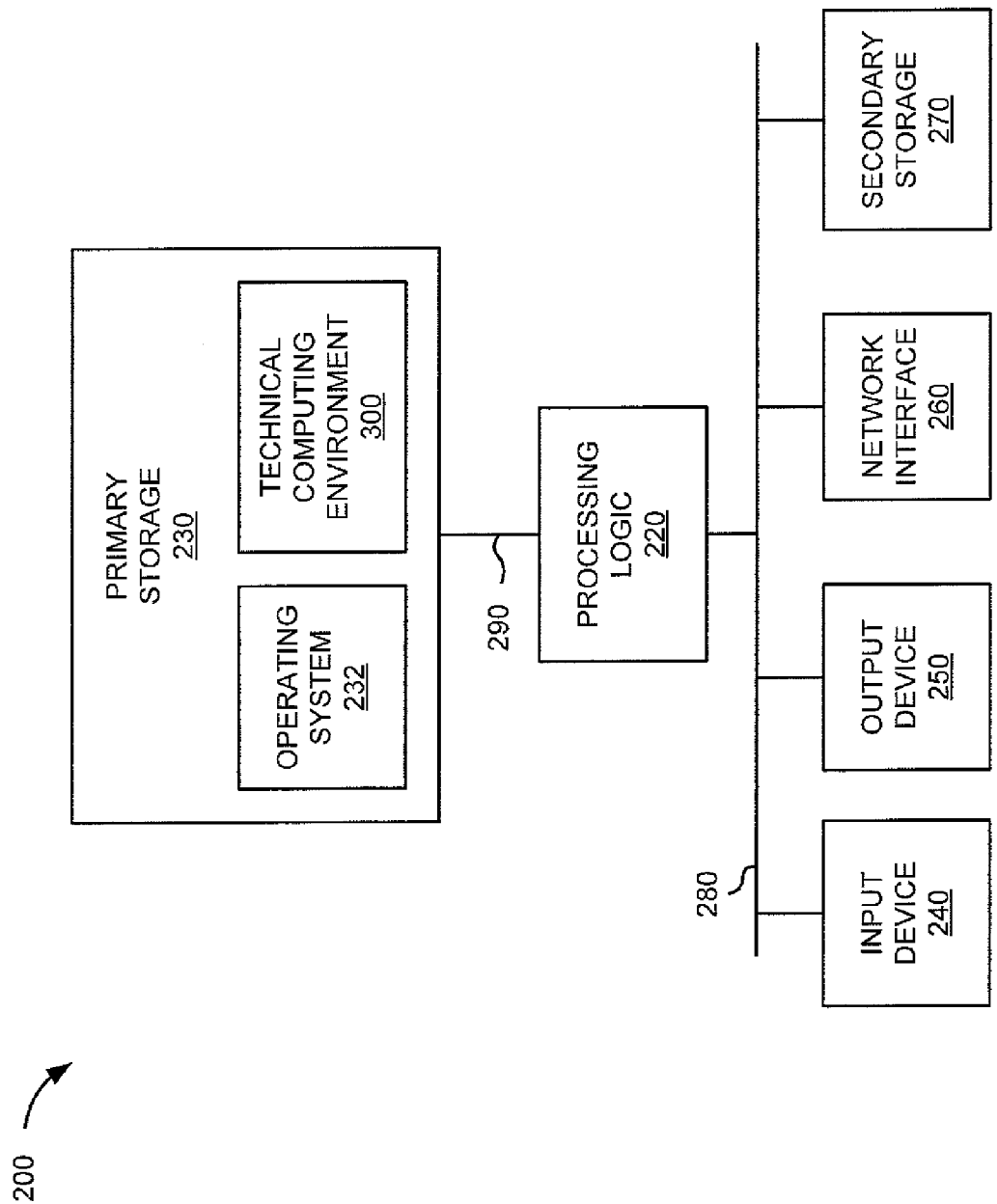
FIG. 2 illustrates an example of a computer system that may be configured to practice one or more embodiments of the invention.

The computer system 200 may include logic configured to generate and/or process class definitions that may be associated with one or more computer programs. FIG. 2 illustrates an example of a computer system 200 that may be configured to practice one or more embodiments of the invention. Referring to FIG. 2, the computer system 200 may include processing logic 220, a primary storage 230, an input device 240, an output device 250, a network interface 260, a secondary storage 270, an input/output (I/O) bus 280, and a primary storage bus 290. It should be noted that computer system 200 is one example of a computer system that may be configured to practice one or more embodiments of the invention. Other computer systems that are more complex or less complex than computer system 200 may be configured to practice one or more embodiments of the invention.

The I/O bus 280 may be an interconnect bus configured to enable information to be transferred between the processing logic 220, input device 240, output device 250, network interface 260, and secondary storage 270. Likewise, the primary storage bus 290 may be an interconnect bus configured to enable information to be transferred between the processing logic 220 and the primary storage 230.

The processing logic 220 may comprise a central processing unit (CPU) that includes logic configured to execute computer-executable instructions and manipulate data contained in the primary storage 230. The instructions and data may be associated with software contained in the primary storage 230, such as an operating system 232 and a technical computing environment (TCE) 300. The processing logic 220 may be a microprocessor, a system-on-a-chip (SoC), FPGA, etc. The processing logic 220 may have a single core or multiple cores. An example of a microprocessor that may be used to implement processing logic 220 is the Intel® Xeon® processor available from Intel Corporation, Santa Clara, Calif.

The input device 240 may include logic configured to input information into system 200 from, e.g., a user. Embodiments of the input device 240 may include keyboards, touch sensitive displays, biometric sensing devices, computer mice, trackballs, pen-based point devices, etc.

The output device 250 may comprise logic configured to output information from system 200. Embodiments of the output device 250 may include cathode ray tubes (CRTs), plasma displays, light-emitting diode (LED) displays, liquid crystal displays (LCDs), printers, vacuum florescent displays (VFDs), haptic devices, tactile devices, etc.

The network interface 260 may comprise logic configured to interface the computer system 200 with the network 140 and enable the computer system 200 to exchange information with other entities connected to the network 140, such as, for example, service provider 150, target environment 160, and cluster 180. The network interface 260 may be implemented as a built-in network adapter, network interface card (NIC), Personal Computer Memory Card International Association (PCMCIA) network card, card bus network adapter, wireless network adapter, Universal Serial Bus (USB) network adapter, modem or other device suitable for interfacing computer system 200 to a network.

The secondary storage 270 may comprise logic configured to implement a secondary storage for the computer system 200. The logic may be configured to store and retrieve information used by the computer system 200 on a computer-readable medium. Embodiments of secondary storage may include magnetic storage (e.g., magnetic disk drive, floppy disk, etc.), optical storage (e.g., CD-ROM drive, DVD drive, CD-ROM, DVD, etc.), semiconductor storage (e.g., flash memory, flash memory-based thumb drives, dynamic random access memory (DRAM), static RAM (SRAM), etc.) and so forth.

The information used by the computer system 200 may include data and/or instructions for processing one or more class definitions. The class definitions may include one or more enumerations. The class definitions may be part of a model, a computer program, etc. The information may be coded as source code, object code, executable code, etc.

The primary storage 230 may comprise logic configured to implement a primary storage for the computer system 200. The primary storage 230 may be directly accessible to the processing logic 220 via the primary storage bus 290. The primary storage 230 may be organized as a random access memory (RAM) and may be implemented using some combination of volatile and non-volatile RAM devices. These devices may include DRAM devices, flash memory devices, SRAM devices, etc.

The primary storage 230 may contain the operating system 232 and the TCE 300. The operating system 232 may be a conventional operating system that is configured to implement various conventional operating system functions, such as scheduling software to run on the processing logic 220, managing the primary storage 230, and controlling access to various entities in the system 200 (e.g., the input device 250, the output device 250, the network interface 260, and the secondary storage 270). Examples of an operating system that may be used include the Linux operating system, Microsoft® Windows® operating system, etc. A version of the Linux operating system that may be used is the Red Hat Linux available from Red Hat Corporation, Raleigh, N.C. A version of the Microsoft® Windows® operating system that may be used is the Microsoft® Windows Vista™ operating system available from Microsoft Inc., Redmond, Wash.

The TCE 300 may be configured to implement a modeling environment that may be used to build, interpret, and execute models. Portions of TCE 300 may include graphical capabilities/features, textual capabilities/features or some hybrid that includes both textual and graphical capabilities/features. The TCE 300 may contain computer-executable instructions (code) and data that are configured to implement some or all of the functionality provided by the TCE 300. Examples of TCEs that may be used with embodiments of the invention are MATLAB® and Simulink®, both of which are available from The MathWorks, Inc., Natick, Mass. Other TCEs that may be used with embodiments of the invention may include Stateflow® and SimEvents®, both of which are available from The MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL), etc.); GNU Octave from the GNU Project; Comsol Multiphysics from Comsol; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Virtuoso from Cadence; Modelica or Dymola from Dynasim AB; VisSim from Visual Solutions; SoftWIRE by Measurement Computing Corporation; WiT by DALSA Coreco; VEE Pro and SystemVue from Agilent Technologies, Inc.; Vision Program Manager from PPT Vision, Inc.; Khoros from Khoral Research, Inc.; Gedae from Gedae, Inc.; Virtuoso from Cadence Design Systems, Inc.; Rational Rose from International Business Machines (IBM), Inc.; Rhapsody and Tau from Telelogic AB; and Ptolemy from the University of California at Berkeley.

The TCE 300 may include hardware and/or software based logic configured to provide a computing environment that may allow a user to perform tasks related to disciplines, such as, but not limited to, mathematics, science, engineering, medicine, business, and so on. The TCE 300 may include a programming language that supports dynamically-typed data and that can be used to express problems and/or solutions in mathematical notations (e.g., the MATLAB® M-language). For example, the TCE 300 may use an array as a basic element, where the array may not require dimensioning. These arrays may be used to support array-based programming where an operation can apply to an entire set of values included in the arrays. Array-based programming may allow array-based operations to be treated as a high-level programming technique and may let a user think and operate on whole aggregations of data without having to resort to explicit loops of individual non-array operations.

In addition, the TCE 300 may be adapted to perform matrix and/or vector formulations that may be used for data analysis, data visualization, application development, simulation, modeling, and/or algorithm development. These matrix and/or vector formulations may be used in many areas, such as statistics, image processing, signal processing, control design, life sciences modeling, discrete event analysis and/or design, state-based analysis and/or design, and so on.

The TCE 300 may further provide mathematical functions and/or graphical tools (e.g., for creating plots, surfaces, images, volumetric representations, etc.). The TCE 300 may provide these functions and/or tools using toolboxes (e.g., toolboxes for signal processing, image processing, data plotting, and/or parallel processing). In addition, the TCE 300 may provide these functions via a library, remote database, etc.

Figure 3:
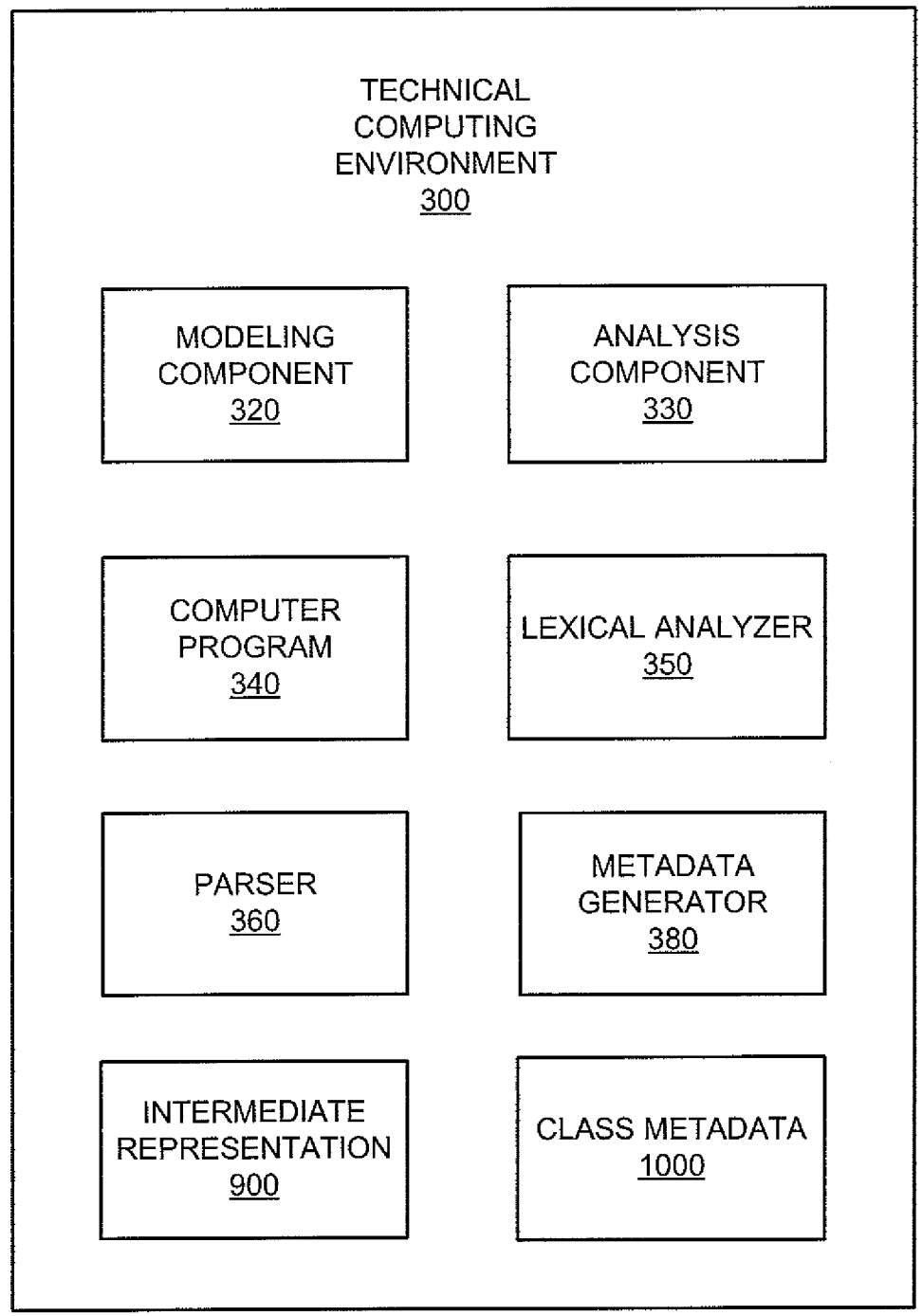
FIG. 3 illustrates an example of a technical computing environment (TCE) that may be configured to practice one or more embodiments of the invention.

FIG. 3 illustrates an embodiment of TCE 300. Referring to FIG. 3, the TCE 300 may include a modeling component 320, an analysis component 330, a computer program 340, a lexical analyzer 350, a parser 360, a metadata generator 380, an intermediate representation 900 and class metadata 1000.

The modeling component 320 may include computer-executable instructions that may be configured to allow, for example, a user to build and/or execute one or more models. The models may be time-based, state-based, event-based, dataflow-based, etc. Aspects of the modeling software 320 may include the MATLAB® and/or Simulink® software. Portions of the computer-executable instructions included in modeling component 320 may be configured to implement an interface, such as a command line interpreter and/or a graphical user interface (GUI). The interface may be configured to enable a user to enter statements (e.g., commands) that may be used, inter alia, to access information, class instances, and so on that may be maintained by the TCE 300. In addition, the interface may be used to enable a user to specify a model which may be, for example, interpreted, compiled, executed, and/or analyzed by TCE 300. The model may be an executable model, such as a block diagram executable model.

The analysis component 330 may include computer-executable instructions that allow a model to be evaluated. Evaluating a model may include generating tests for the model. In addition, evaluating a model may include proving various model properties and generating examples of violations of these properties.

The computer program 340 may be an application program that is supplied, for example, by a user or generated by, for example, the TCE 300 or by some other means. The computer program 340 may include a series of statements coded as source code. The computer program 340 may be part of a model that may be processed (e.g., interpreted, compiled, executed, etc.) by the TCE 300.

The computer program 340 may contain one or more class definitions. The class definitions may be used to define one or more classes, such as enumeration classes. The class definitions may be associated with one or more enumerations that enumerate one or more instances of the one or more classes. The enumeration may enumerate a partial list of instances of a class. The class definitions may also be associated (e.g., contain) with one or more specifications of one or more superclasses to which one or more instances of the one or more classes belong. One or more instances enumerated in the enumeration may be associated with an attribute. The attribute may specify an access level of the instances.

The lexical analyzer 350 may be configured to acquire the class definitions contained in the computer program 340 and convert them into a stream of one or more tokens (token stream). A token may be used to represent one or more portions of the class definitions. The portions may be referred to as lexemes and may include, e.g., keywords, variable names, function names, etc. In an example arrangement, a class definition may be converted into tokens by reading the class definition as a stream of characters, identifying lexemes in the stream and categorizing the lexemes into tokens. Regular expressions may be used by the lexical analyzer 350 to process the lexemes into tokens. The lexical analyzer 350 may be generated using a software tool, such as the lex programming tool.

The parser 360 may be configured to analyze the syntactical and/or grammatical structure of the token stream and generate an intermediate representation 900 based on the analysis. The parser 360 may be configured to analyze the token stream to determine if it contains one or more allowable expressions. This analysis may include syntactic analysis. Syntactic analysis may involve using rules that express a grammar (e.g., context-free grammar, etc.) associated with allowable expressions. The rules may be used by the parser 360 to determine if the token stream contains one or more allowable expressions. The allowable expressions may be used to generate the intermediate representation 900. The parser 360 may be generated using a software tool, such as the yacc parser generator tool.

As noted above, the intermediate representation 900 may be generated as a result of processing a class definition associated with a class. The intermediate representation 900 may be a data structure (e.g., a parse tree) that is configured to hold information associated with the class definition. Further details of intermediate representation 900 will be described below with respect to FIG. 9.

The metadata generator 380 may be configured to analyze the intermediate representation 900 and generate class metadata 1000 that represents a class. Further details of the class metadata 1000 will be described below with respect to FIG. 10.

As noted above, a class definition may be used to define a class. The class definition may contain a keyword that may indicate a start of the class definition and an identifier (e.g., name) that may be used to identify the class. The keyword may be a symbol that is built into the syntax of a computer language associated with the class definition. The class definition may also contain one or more declarations of data members and/or member functions, which may define functionality associated with the class.

Figure 4:
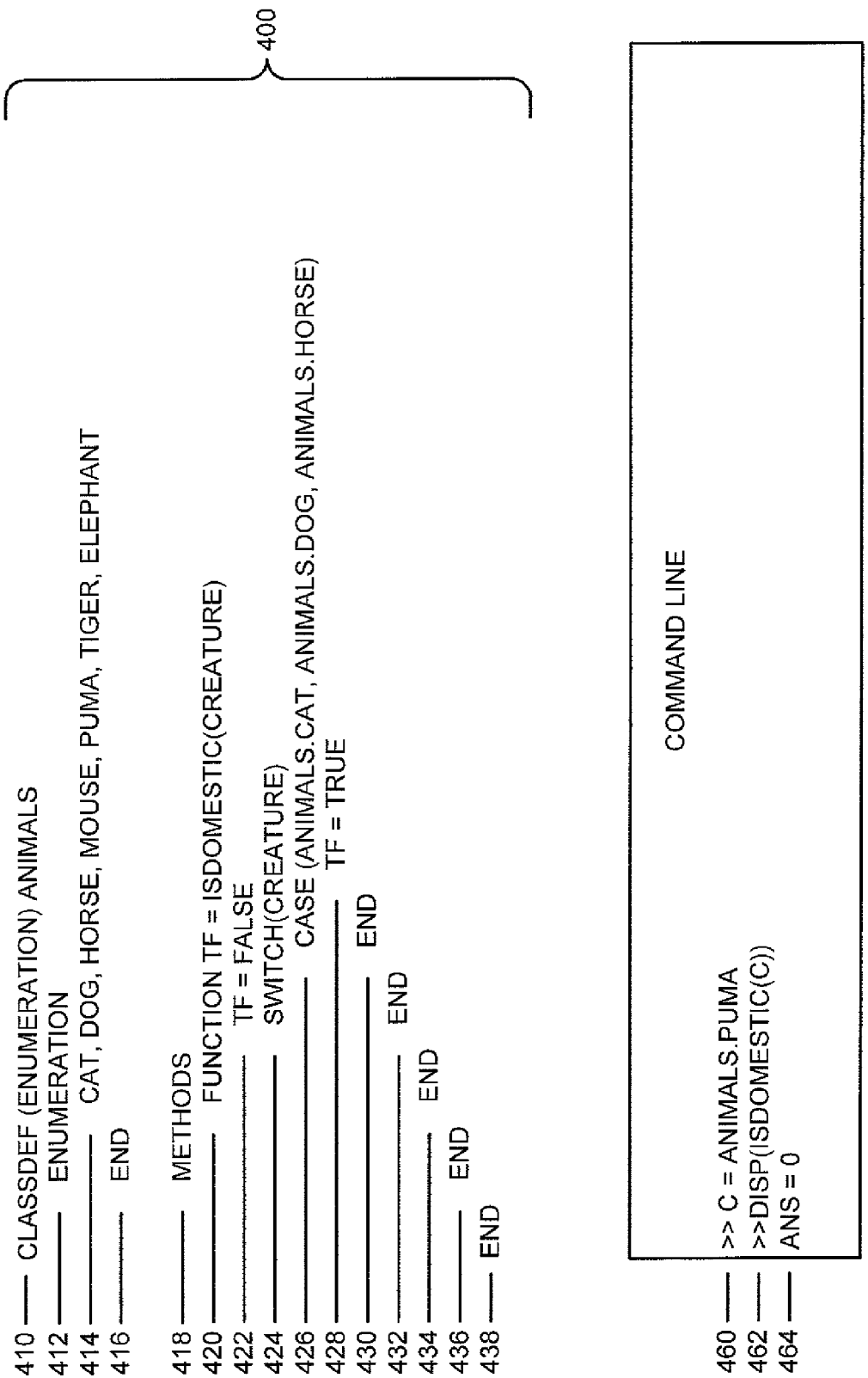
FIG. 4 illustrates an example of a class definition of an enumeration class.

FIG. 4 is an example of a class definition 400 of an enumeration class. The class definition 400 may be contained in computer program 340. Referring to FIG. 4, at line 410, the keyword "CLASSDEF" may denote the beginning of the class definition 400. Also at line 410, the keyword "ENUMERATION" may be used to indicate that the class definition 400 is for an enumeration class. Note that in this example, the keyword "ENUMERATION" is enclosed in parenthesis. At line 410, the word "ANIMALS" is a name that is used as an identifier that may be used to identify the enumeration class.

Lines 412 through 416 illustrate an enumeration block associated with the class. The keyword "ENUMERATION" indicates the beginning of the enumeration block. The enumeration block contains an enumeration which is illustrated at line 414. The enumeration may contain a list of instances of the class, which in this example is named "ANIMALS". At line 416, the keyword "END" indicates the end of the enumeration block.

Lines 418 through 436 illustrate a methods block that may include various declarations of execution methods, such as a software functions, associated with the class. The methods block begins with the keyword "METHODS", which is illustrated at line 418 and ends with the keyword "END", which is illustrated at line 436. The methods block contains a declaration of a function which begins at line 420 and ends at line 434. The function is configured to determine if a parameter passed into the function represents a domestic animal and if so, return a logical TRUE condition. Otherwise, a logical FALSE condition is returned.

Specifically, at line 420, the keyword "FUNCTION" indicates the beginning of the function declaration. Also at line 420, "TF" is a name that is used to identify a variable that is returned by the function and "ISDOMESTIC" is the name that is used to identify the function. The word "CREATURE" is a name that is used to identify the parameter that is passed into the function.

At line 422, the value of "TF" is set to a logical FALSE. At lines 424 and 426, a switch statement and a case statement compare the value of "CREATURE" with one or more instances of the enumeration listed in the case statement to determine if they match. If so, the statement at line 428 sets the value of "TF" to a logical TRUE. The keywords "END" at lines 430 and 432 indicate the end of the case statement and the switch statement, respectively. Note that if the value of "CREATURE" does not match any of the instances listed in the case statement, "TF" retains its initialized value, which in this example is a logical "FALSE". The value of "TF" is returned to the caller. The "END" keyword at line 434 denotes the end of the function declaration and the "END" keyword at line 436 denotes the end of the methods block declaration. The "END" keyword at line 438 denotes the end of the class definition 400.

Lines 460 through 464 illustrate example statements that may be used to set an object to an instance of the class defined by the class definition 400 using, e.g., a command line interpreter. Specifically, the statement at line 460 sets an object named "C" to a class instance of the enumeration class named "PUMA". The statement at line 462 calls the "ISDOMESTIC" function associated with the class and passes the object "C" as a parameter to the function. In addition, the statement at line 462 calls a function named "DISP" to display the result returned by the "ISDOMESTIC" function. The command line interpreter may display the result as illustrated at line 464. In this example, the result is "0", which indicates a logical FALSE was returned by the "ISDOMESTIC" function. As noted above, a logical FALSE is returned by the "ISDOMESTIC" function if the parameter is set to an instance that is not listed in the case statement at line 426.

An enumeration class may be used to name a fixed set of values belonging to a class. Here, a class definition associated with the enumeration class may include a specification of one or more superclasses to which one or more instances of the class belong. A class may be a set of objects having common characteristics. Two classes may have a relationship such that one may be a superclass and the other may be a subclass. The superclass may define a superset of objects and the subclass may define a subset of objects sharing the characteristics of the superclass and having additional characteristics common to the subclass. A subclass that is derived from a superclass may inherit all of the functionality (e.g., member functions, data members, etc.) associated with the superclass. It should be noted that keywords used herein, such as "CLASSDEF", "METHODS", "END", "ENUMERATION", etc. are illustrative and that other keywords can be used without departing from the spirit of the invention.

Figure 5:
FIG. 5 illustrates an example of a class definition of an enumeration class that includes a specification of a superclass.

FIG. 5 illustrates an example of a class definition 500 for an enumeration class that includes a specification of a superclass. The class definition 500 may be contained in computer program 340. Referring to FIG. 5, the class definition begins at line 510 and ends at line 522. At line 510, the keywords "CLASSDEF" and "ENUMERATION" indicate that the class defined by the class definition 500 is an enumeration class, as described above. The statement at line 510 also includes an indicator, that indicates the enumeration class is a subset of a superclass, and an identifier that identifies a type of the superclass. In this example, the indicator is represented by the character "<" and the identifier is represented by the text "INT32". The text "INT32" may identify the superclass as a 32-bit integer class type.

In other embodiments, the indicator may be represented using one or more keywords, other characters, etc. Also in other embodiments, the superclass may be a different type, such as a Boolean class, other integer class, floating-point class, string class, user-defined class, etc.

The class definition contains an enumeration block, which begins at line 512 and ends at line 520. The enumeration block specifies an enumeration that includes three instances of the class. Each instance is associated with an identifier (which in this example is a name) and an argument list. In FIG. 5, the argument list is located next to the identifier and is contained in parenthesis. For example, the instance listed at line 514 is associated with the identifier "HIGH" and the argument list that contains the value "100". Likewise, for example, the instances illustrated at lines 516 and 518 are associated with the identifiers "MEDIUM" and "LOW", and the argument lists contain the values "50" and "1", respectively. Note that in other embodiments, an enumeration may be specified in other ways using other forms of syntax and/or grammar.

A class may be associated with (e.g., contain) a constructor function, which may be used to construct (create) an instance of the class. An instance may be constructed by calling the class' constructor function with an argument list that is associated the with instance.

Note that the argument lists associated with instances in an enumeration may have gaps. For example, as noted above, the "HIGH" instance is associated with an argument list that contains the value "100" and the "MEDIUM" instance is associated with the argument list that contains the value "50". If a value of "75" is passed to the constructor function for the class, the value may be considered "undefined" and an exception (e.g., an error event) may be generated and/or a message (e.g., an error message) may be displayed. Note that other techniques may be employed to handle the undefined value. For example, an enumeration may contain instances that are associated with argument lists that contain special values that are reserved to indicate certain exception conditions. Here, attempting to specify an undefined instance may cause a special value that indicates an error condition to be returned, displayed, etc. In another example, rounding may be used to handle an undefined value. Here, in the example above, if a value of "75" is passed to a constructor for the class illustrated in FIG. 5, the value may be rounded up to select the "HIGH" instance or rounded down to select the "MEDIUM" instance.

The argument lists associated with instances 514-518 are of an integer data type. However, it should be noted that other data types may be associated with instances in an enumeration. For example, an enumeration may contain an argument list of a particular data type that enables different variants of algorithms to be specified. Other examples may include other data types, such as arrays, floating-point values, vectors, other data structures, and so on.

Referring back to FIG. 5, since the enumeration is a subclass of the superclass identified as "INT32", each instance inherits functionality associated with the "INT32" superclass. This functionality may include functionality associated with maintaining the argument lists associated with the instances. For example, the functionality may include mathematical operations that may be used to operate on the argument lists associated with the instances. An argument list passed to a constructor function of a subclass may be passed to a superclass' constructor function in cases where there subclass is a subclass of the superclass.

An enumeration may be used to enumerate a partial list of instances of a class. FIG. 6 illustrates an example of a class definition 600 of a class having an enumeration that enumerates a partial list of instances of the class. The class definition 600 may be contained in computer program 340.

Referring to FIG. 6, the class definition 600 begins at line 610 and ends at line 642. At line 610, the class is identified by the name "COLOR". Lines 612 through 620 contain a declaration of properties associated with the class. In this example, the properties include data members named "RED", "GREEN", and "BLUE". The data members may be variables that may hold numbers (e.g., floating point numbers) that may represent values (e.g., intensity) associated with the colors red, green and blue, respectively.

Lines 622 through 634 illustrate a method block contained within the class definition 600. The method block contains a declaration of a function that is a member function associated with the class. In this example, the function is named "COLOR" and is configured to establish values for data members associated with an instance of the class. Specifically, "R", "G", and "B" are input parameters for the function. At lines 626 through 630, the values of the data members "RED", "GREEN", and "BLUE" are set to the values of the input parameters "R", "G", and "B", respectively.

The class definition 600 contains an enumeration block, which is illustrated at lines 636 through 640. The enumeration block specifies an enumeration 638 which is associated with the class. The enumeration 638 lists eight instances. Each instance is associated with an argument list containing three values that may be used to establish the value of the "RED", "GREEN", and "BLUE" data members for that instance. For example, the "ORANGE" instance is associated with the argument list "1, 0.5, 0" which may be used to establish the value of the "RED", "GREEN", and "BLUE" data members for that instance.

Note that the enumeration contains a partial list of instances of the class. In other words, instances of the class may include instances not listed in the enumeration. For example, an instance of the class that is not included in the enumeration may have its "RED", "GREEN", and "BLUE" data members set to "0.75", "0.5", and "0", respectively.

Lines 660 through 664 illustrate example statements that may be entered into a command line interpreter to set an object to an instance of the class defined by the class definition 600 and display the name of the class. Specifically, at line 660, an object named "RC" is generated based on a "RED" instance of the "COLOR" class defined in the class definition 600. Note that the data members "RED", "GREEN", and "BLUE" for this object are set to the values "1", "0", and "0", respectively.

At line 662, a function named "CLASS" is called with the argument "RC". The function "CLASS" returns a class identifier associated with the argument passed into the function. In this example, the argument passed into the function "CLASS" is the object "RC" and the identifier associated with the class for "RC" is "COLOR". This identifier is returned by the function call and is displayed, as illustrated at line 664.

It should be noted that an interface may be provided to allow for input completion when input related to an enumeration is entered. For example, a user may be provided with a list of possible instances associated with the enumeration after the user has entered a certain amount of information associated with an enumeration class. For instance, at line 660, after the text "RC=COLOR." is entered, a list of identifiers associated with instances of the class "COLOR" may be displayed and the user may be allowed to specify an instance by specifying a particular displayed identifier. Thus, the list may include "RED", "GREEN", "BLUE", "YELLOW", "ORANGE", "VIOLET", "BLACK", and "WHITE" and the user may select the "GREEN" instance by typing, e.g., the letter "G". The list may be displayed in response to the user entering a "TAB" character or the list may be displayed automatically. Information contained in the list may be based on input history, code that defines the enumeration, a directory of information, or other information retrieved from searches or directly retrieved. The information may be retrieved from a network (e.g., the Internet), a data base, and so on.

Various attributes may be associated with one or more instances in an enumeration class. These attributes may be used, for example, to control access to the one more instances. FIGS. 7A-B illustrate examples of class definitions having enumerations, attributes associated with instances enumerated by the enumerations, and default instances. The class definition 700 may be contained in computer program 340.

Referring to FIG. 7A, class definition 700 begins at line 710 and ends at line 756. At line 710, the class is identified by the name "COLOR". Lines 712 through 720 illustrate a properties block that contains declarations for data members that are named "RED", "GREEN", and "BLUE" and are associated with the class. Lines 722 through 734 illustrate a methods block that contains a declaration for a member function named "COLOR" that is associated with the class. The function may be used to establish the value of the "RED", "GREEN", and "BLUE" data members, as described above.

A first enumeration block containing a first enumeration begins at line 736 and ends at line 740. The first enumeration contains a partial list of instances of the class.

A second enumeration block containing a second enumeration is illustrated at lines 740 through 748. At lines 744 through 746, the second enumeration lists two instances of the class. At line 742, the block contains an attribute that specifies a level of access to the instances of the block. In this example, the access level is "private", which means that the instances may only be accessed from within the class and cannot be accessed outside of the class. Note that other access levels, such as "protected" and "public", may be specified. Note also that, in this example, the access mode applies to all instances listed in the second enumeration.

In other embodiments, an attribute may be specified to apply to a particular instance of the class. For example, assuming the access level for the instances in the first enumeration is public, if only the instance named "RED" in this enumeration is to be associated with an access level of private, the instance named "RED" the declaration for this instance may be declared as, for example, "RED (1,0,0)=PRIVATE". The access level for the other instances would remain unchanged, i.e., they would remain public.

A default enumerated instance may be associated with a class. In definition 700, the default instance for the class "COLOR" is specified at lines 750 to 754 as "RED". The default enumerated instance may be used to provide a default instance for a variable where no specific instance is specified. For example, using the above-defined "COLOR" class, the statement "A(3)=COLOR.BLUE" may be used to generate an array of three elements wherein each element holds a value associated with an instance of the class and the third element of the array (e.g., "A(3)") is set to a value associated with the instance "BLUE". Since the statement does not specify an instance for the first two elements of the array (e.g., "A(1)" and "A(2)"), the default instance "RED" may be used to establish values for these elements. Thus, in this example, the first two elements in the array would hold a value associated with the "RED" instance and the third element in the array would hold a value associated with the "BLUE" instance. For code that is generated for a model in a computer language, such as C, C++, Java, etc., a default enumerated instance specified for a class may also be used to establish values for variables specified in the code where the code does not specify a particular instance for the variable. Here, the usage of the default value may provide safe data type conversion. For example, the code "COLOR VAR1;" does not specify any particular instance whose value may be used to establish the value of "VAR1". Assuming the "COLOR" class specified in the code is the same "COLOR" class defined above, the value associated with the default instance "RED" may be used to establish the value of "VAR1".

FIG. 7B illustrates an example of another class definition 760 for the above-described "COLOR" class. At lines 770-774, the class definition 760 includes a member function named "GET_DEFAULT" that is configured to provide (e.g., returns) a default value for the class. Calling the function can cause the default instance of the class to be provided. In this example, the default instance is the "RED" instance.

An instance listed in an enumeration may be associated with one or more identifiers. FIG. 8 illustrates an example of a class definition 800 of an enumeration class having an instance associated with multiple identifiers. The class definition 800 may be contained in computer program 340.

Referring to FIG. 8, the class definition begins at line 810 and ends at line 824. At line 810, the identifier of the enumeration class, which in this example is a name, is specified as "ONOFF" and the class is declared as a subclass of a superclass identified as "LOGICAL". In this case, the superclass may contain two states "TRUE" and "FALSE" where the "TRUE" state may be represented by the value "1" and the "FALSE" state may be represented by the value "0".

The definition contains an enumeration block, which begins at line 812 and ends at line 822. The enumeration block includes an enumeration that contains two instances. One instance represents the "TRUE" state of the superclass and the other instance represents the and "FALSE" state of the superclass.

Note that each instance is associated with two identifiers, which in this example are names. Specifically, the names "OFF" and "NO" (declared at lines 814 and 818, respectively) are associated with the instance that represents the "FALSE" state. The names "ON" and "YES" (declared at the lines 816 and 820, respectively) are associated with the instance that represents the "TRUE" state.

Each instance may be referenced by either name associated with the instance. Thus, for example, the instance that represents the "TRUE" state may be referenced using either "ON" or "YES". Likewise, for example, the instance that represents the "FALSE" state may be referenced using either "OFF" or "NO".

An enumeration class may have a class constructor, which may be a member function of the class. The class constructor may be generated automatically by an entity that processes a class definition that defines the enumeration class. The class constructor may be identified by an identifier and the identifier may be the same identifier that is used to identify the enumeration class. For example, in an embodiment, the class definition 800 is included in computer program 340. The TCE 300 may automatically generate a class constructor for the class defined by the class definition 800 when processing computer program 340. The TCE 300 may name the class constructor "ONOFF", which in this example is the same name associated with the class defined by the class definition 800.

The class constructor for an enumeration class may be called from outside the enumeration class. The call may include an argument list of one or more input parameters that may be used by the class constructor. In an embodiment, the class constructor may use the argument list to identify an instance of the enumeration class.

For example, line 860 contains a statement that may be issued to a command line interpreter to call a class constructor associated with the enumeration class defined by class definition 800. Specifically, at line 860 the statement calls the class constructor associated with the "ONOFF" class and passes an argument list containing a value of "1". The class constructor may use the argument list to identify an instance of the enumeration class that is associated with that value. The identified instance may be returned to the caller. The instance may be returned as a pointer to the instance, a name associated with the instance, a copy of the instance, a handle associated with the instance, etc. In this example, the instance may be displayed by the command line interpreter as illustrated at line 862.

A class definition of a class may be processed and an intermediate representation that represents the class definition may be generated. For example, in computer system 200, intermediate representation 900 may be generated by parser 360 to represent a class defined by a class definition contained in computer program 340.

Figure 9:
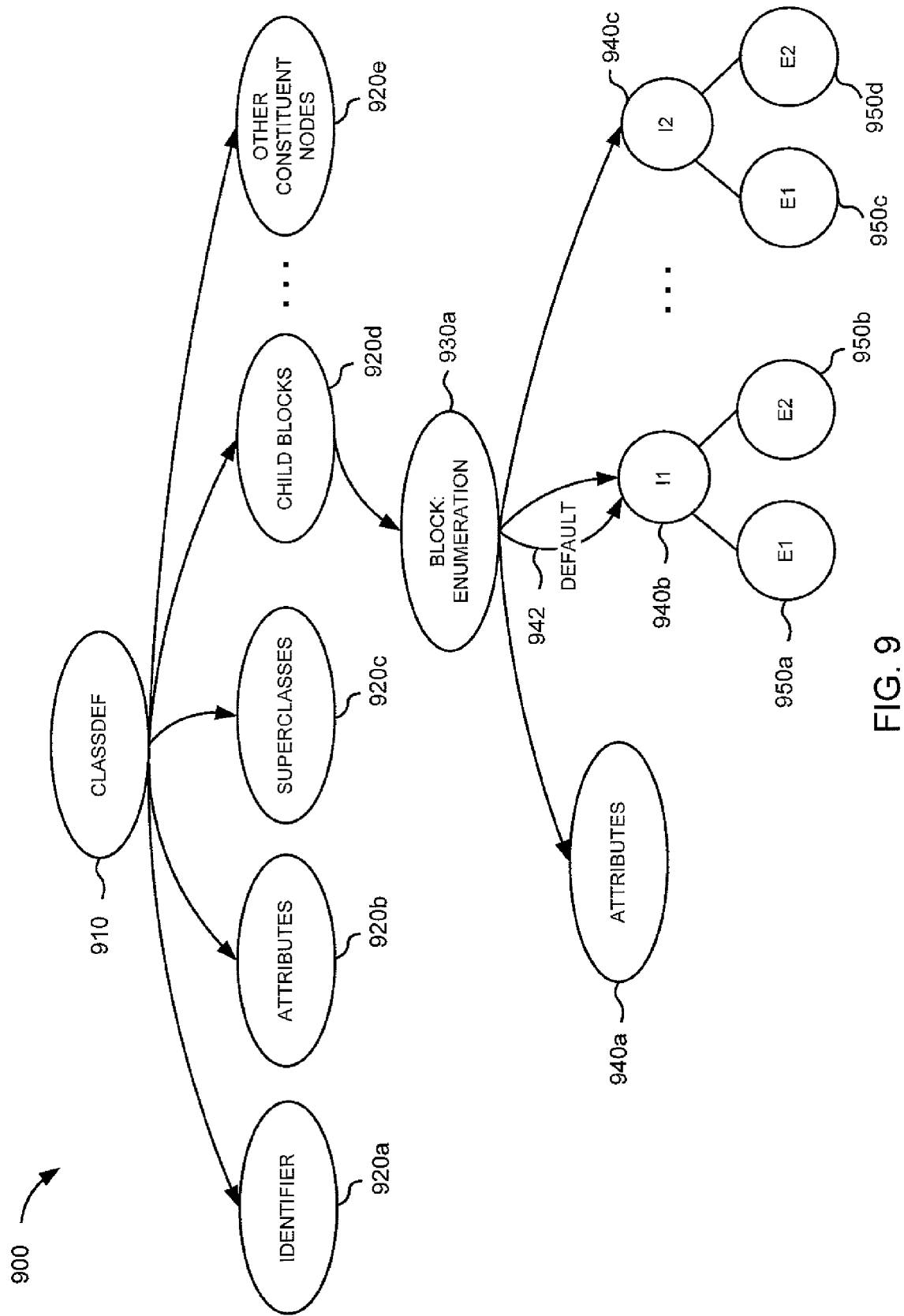
FIG. 9 illustrates an example of an intermediate representation that may be used to represent a class definition.

FIG. 9 illustrates an example of an intermediate representation 900 that may be used to represent a class defined by a class definition. The class definition may be contained in computer program 340 and the class may be an enumeration class. Referring to FIG. 9, intermediate representation 900 may be a data structure organized as a tree-like structure (e.g., a hierarchical tree) having one or more nodes. The tree may be a parse tree and may include a root node 910 and several levels of nodes below the root node 910. It should be noted that other types of intermediate representations may be used to represent a class definition.

The root node 910 may be used to represent a root of the data structure. The root may indicate a highest (topmost) level of the tree. The root node 910 may be generated in response to identifying a keyword in the class definition that may denote the beginning of the class definition (e.g., "CLASSDEF").

Immediately below the root node 910 may be a level of nodes 920 that represent various entities associated with the class. These entities may include identifiers, attributes, superclasses, child blocks and other constituents that are associated with the class.

An identifier node 920*a* may be configured to represent an identifier associated with the class. The identifier may be, for example, a name associated with the class. The identifier node 920*a* may be generated in response to identifying an identifier for the class in the class definition.

An attribute node 920*b* may be configured to represent a top-level of a sub-tree of nodes (not shown) that represent attributes associated with the class definition. For example, in the class definition 800, keyword "ENUMERATION" illustrated at line 810 may be considered an attribute of the class definition and the sub-tree may contain a node that represents that keyword.

A superclass may be represented by a superclass node 920*c*. The superclass node 920*c* may be generated in response to identifying an indicator (e.g., keyword, character, etc.) in the class definition that indicates the class is subset of a superclass. A type of class of the superclass may be represented in the superclass node 920*c* or by a node that is below the superclass node 920*c* in the tree's hierarchy.

The child blocks node 920*d* may be a top-level for a sub-tree that contains information associated with blocks (e.g., method blocks, properties blocks, enumeration blocks, etc.) contained in the class definition. The sub-tree may contain nodes below the child blocks node 920*d* that represent the blocks. For example, in FIG. 9, node 930*a* represents an enumeration block that is contained in the class definition. Below node 930*a* are nodes that represent information associated with the enumeration block. Likewise, for example, node 940*a* may be used to represent an attribute associated with the enumeration block (e.g., "ACCESS=PRIVATE").

Nodes 940*b*, 940*c* represent instances enumerated in the enumeration block. Nodes 950*a-d* represent entities associated with the instances, such as, for example, identifiers, argument lists, etc. As noted above, a class may include a default instance. In intermediate representation 900, the default instance is the instance associated with node 940*b*. This is indicated in the intermediate representation 900 by pointer 942.

Various entities associated with the class may be represented by other constituent nodes 920*e*. The entities may be represented using multiple levels of nodes below the constituent nodes 920*e*.

Note that in the intermediate representation 900, certain nodes may be added and/or omitted depending on the definition of the class used to generate the intermediate representation 900. For example, if the class is not associated with a superclass, the superclass node 920*c* may be omitted. Likewise, for example, the superclass node 920*c* and identifier node 920*a* may have multiple levels of nodes that extend below these nodes 920*a*, 920*c* that are used to represent information associated with the superclass and identifier, respectively. Also note that intermediate representation 900 is just one example of an intermediate representation 900 that may be used to represent a class definition. Other types of data structures (e.g., tables, databases, etc.) may be used to provide an intermediate representation that represents a class definition.

Figure 10:
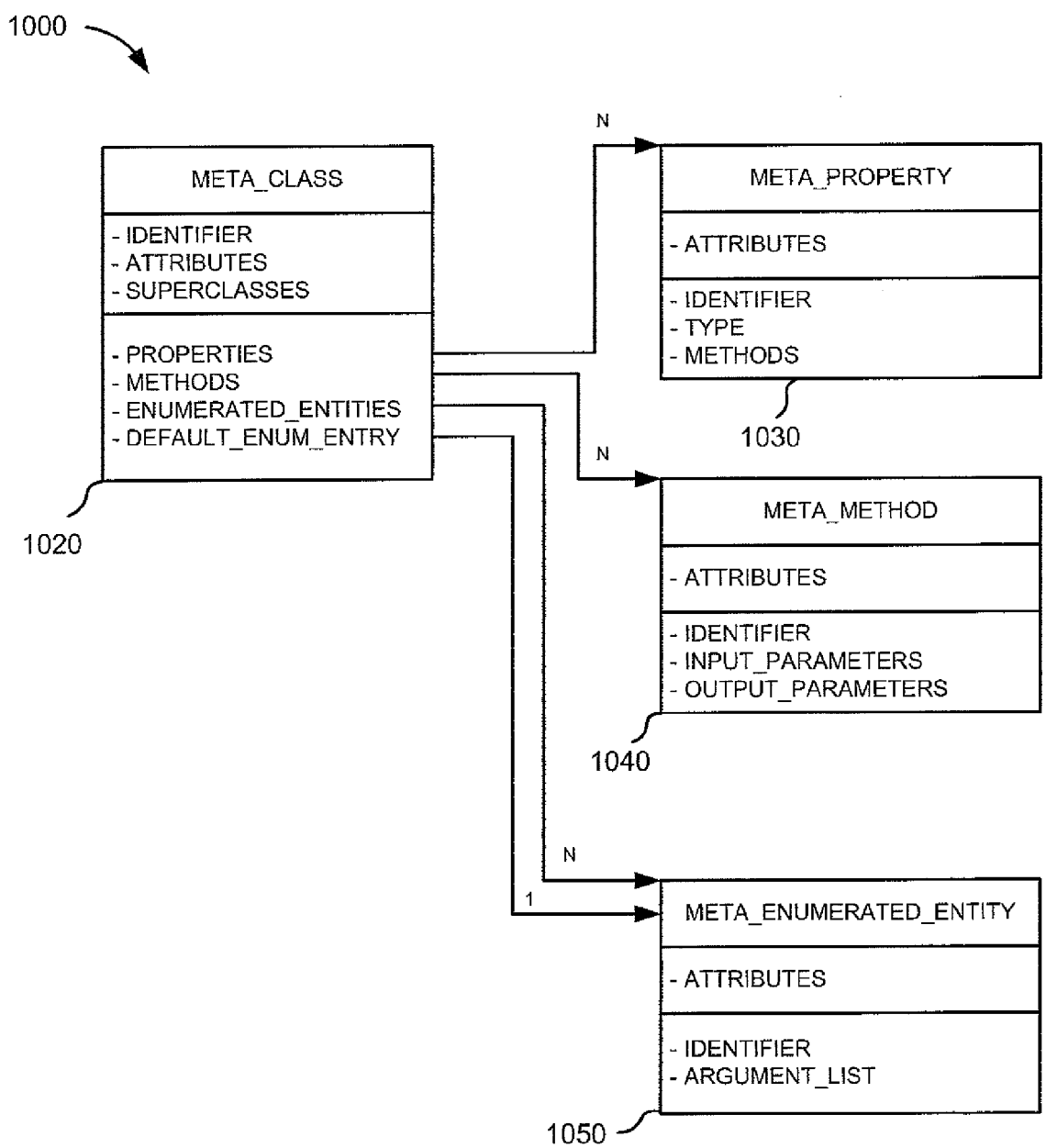
FIG. 10 illustrates an example of metadata that may be used to represent a class.

FIG. 10 illustrates an example of metadata 1000 that may be used to represent a class. The class may be, for example, an enumeration class. As will be described below, the metadata 1000 may be generated from information contained in an intermediate representation, such as intermediate representation 900. However, metadata used with embodiments of the invention may be generated from other sources. For example, the metadata may be generated from information contained in a file, information contained in a block diagram, information generated from a program, information specified by a user, and so on.

Referring to FIG. 10, the metadata 1000 may include a META_CLASS object 1020, and one or more META_PROPERTY objects 1030, META_METHOD objects 1040 and META_ENUMERATED_ENTITY objects 1050.

The META_CLASS object 1020 may contain information associated with the class. This information may include an identifier (e.g., name), attributes, superclasses, and pointers to META_PROPERTY 1030, META_METHODS 1040, and META_ENUMERATED_ENTITY 1050 objects associated with the class. The identifier may be derived from information contained in the identifier node 920*a* and any sub-nodes below the identifier node 920*a*. The attributes may be derived from information contained in the attribute node 920*b* and any sub-nodes below the attribute node 920*b*. The superclasses may specify one or more superclasses to which the class belongs. The superclasses may be derived from information contained in superclasses node 920*c*. The pointers may be established when metadata objects for the properties, methods, enumerations, etc. are generated.

A META_PROPERTY object 1030 may be used to represent a data member associated with the class. The object 1030 may include attributes, an identifier, a class and methods associated with the data member. The attributes may include an access level associated with the data member (e.g., private, protected, public, etc.). The identifier may include an identifier (e.g., a name) that is used to identify the data member. The class may include a class (e.g., integer class, float class, string, user-defined class, etc.) associated with the data member. The methods may include functions associated with the data member. For example, the functions may include functions for getting and setting the data member.

A META_METHOD object 1040 may be used to represent a member function associated with the class. The object 1040 may include attributes, an identifier, input parameters, and output parameters associated with the member functions. The attributes may specify, e.g., an access level associated with the function. The identifier may specify an identifier (e.g., a name) that may be used to identify the function. The input parameters and output parameters may specify various details associated with the input and output parameters, respectively, associated with the function. These details may include data types, identifiers, etc. associated with the parameters.

A META_ENUMERATED_ENTITY object 1050 may be used to represent an enumerated instance in an enumeration associated with the class definition. The META_ENUMERATED_ENTITY object 1050 may include attributes, identifiers, and arguments associated with the instances. The attributes may include an access level associated with the instance. The identifier may include an identifier (e.g., name) that may be used to identify the instance. The argument list may include an argument list associated with the instance. The argument list may include values (e.g., numbers) associated with the instance.

As noted above, a default instance for an enumeration may be associated with an enumerated instance. In metadata 1000, this relationship is represented by a pointer 1028 in the META_CLASS object 1020 to a META_ENUMERATED_ENTITY object 1050 that represents an instance that is the default instance for the enumeration.

Figure 11:
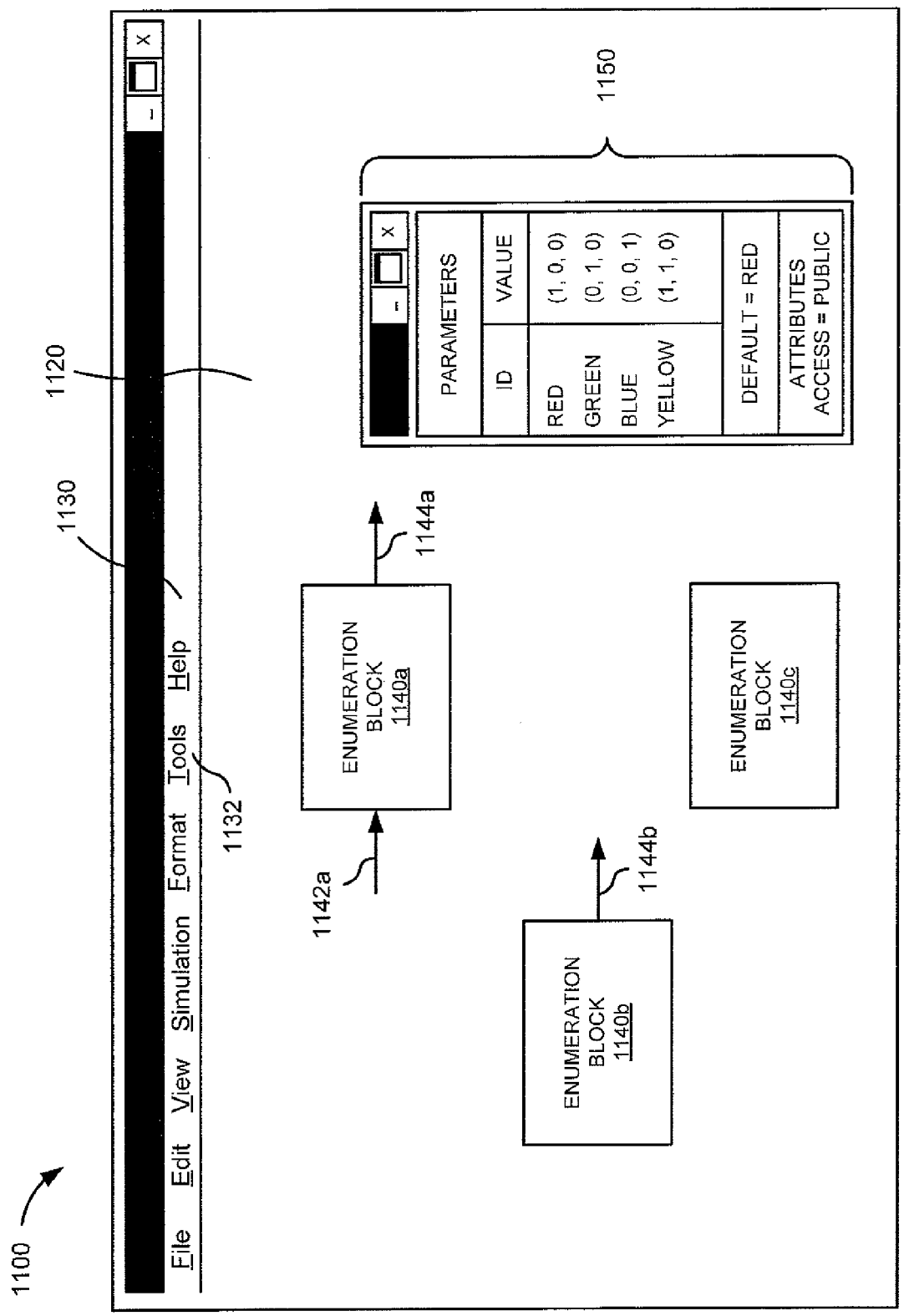
FIG. 11 illustrates an example of a graphical block that may be used to represent an enumeration class.

FIG. 11 illustrates examples of graphical blocks 1140 that may be used to represent enumeration classes in, e.g., a graphical modeling environment. The graphical modeling environment may be part of TCE 300. An example of a graphical modeling environment is Simulink®. The graphical blocks 1140 may be executable blocks that are part of an executable model (e.g., an executable block diagram model), which may be generated and/or executed in the graphical modeling environment.

Graphical block 1140*a* may be a conversion block that may contain an input 1142*a* which is converted to a particular output 1144*a*. The input 1142*a* may be configured to receive a signal (e.g., a value) that may be used to select an instance of the class represented by the graphical block 1140*a*. The instance that is selected may be associated with a value that matches the signal at the input 1142*a*. Output 1144*a* may be configured to output a signal that represents a value associated with the selected instance. Various actions may be taken in situations where a signal at input 1142*a* does not match a value associated with a particular instance. For example, a value associated with a default instance for the class may be output from output 1144*a*. Likewise, for example, an error condition may be reported.

Graphical block 1140*b* may be a source block that contains an output 1144*b* that outputs a value associated with an instance of the class. The block may be configured to output a particular instance of the enumeration class represented by the block 1140*b*. The instance may be selected using a graphical user interface (GUI) window, such as window 1150 (discussed further below).

Graphical block 1140*c* may be a definition block that provides a definition of the enumeration class. The definition block may be used by other blocks in the model that make reference to the class.

Note that a model may contain other blocks that operate on the enumeration list associated with an enumeration class block 1140. For example, the model may contain a relation operation switch case block that utilizes enumerated values in an enumeration list associated with an enumeration class block 1140.

An enumeration class referenced by an enumeration block 1140 can be internally defined within the block or externally defined outside the block. For example, an enumeration block 1140 may reference a class definition that is defined in code provided by a user, generated code, etc.

A user may interact with block 1140 through one or more graphical windows 1100 that may be provided by the graphical modeling environment. Graphical window 1100 may provide an interface through which commands relating to block 1140 may be entered. For example, graphical window 1100 may include a menu bar 1130 that may allow the user to select various menus. The menus may contain menu selections that when selected perform various functions. For example, menu bar 1130 contains a "tools" menu 1132 which may include a menu selection (not shown) that when selected may, for example, display parameter window 1150 (described further below). It should be noted that other techniques may be used to enter commands relating to block 1140. For example, a command line interface may be provided, e.g., in a separate window (not shown), that enables commands relating to the block 1140 to be entered.

Parameter window 1150 provides an example of information associated with the enumeration block 1140 that may be displayed. The information may include identifiers of instances of an enumeration class associated with enumeration block 1140 and values associated with the instances. In addition, the window 1150 may display other information associated with the class represented by the enumeration block 1140, such as, for example, default values, attributes, etc.

The window 1150 may include provisions for specifying one or more parameters (e.g., identifiers, values, attributes, default instance) associated with the class. The parameters may be specified for a single instance or multiple instances of the class. For example, the window 1150 may include provisions for specifying an identifier associated with a particular instance of the class. Likewise, for example, the window 1150 may include provisions for specifying an attribute (e.g., access level) that applies to all instances of the class. In addition, window 1150 may contain provisions for adding instances to the class, deleting instances from the class, and so on. The window 1150 may be displayed, for example, in response to selecting block 1140. Block 1140 may be selected by clicking on the block, hovering a mouse cursor over block 1140, and so on. In addition, window 1150 may be displayed in response to selecting block 1140 and selecting to display the window 1150 from a menu selection (for example, as described above). Moreover, window 1150 may be displayed in response to one or more commands that are entered via a command line interface (not shown). Note that window 1150 is an example of a parameter window that may be displayed for a particular enumeration block. Other parameter windows that may be displayed may include more or less information about an enumeration block than is depicted in window 1150. Moreover, the design and layout of these parameter windows may differ from the design and layout of window 1150.

Figure 12:
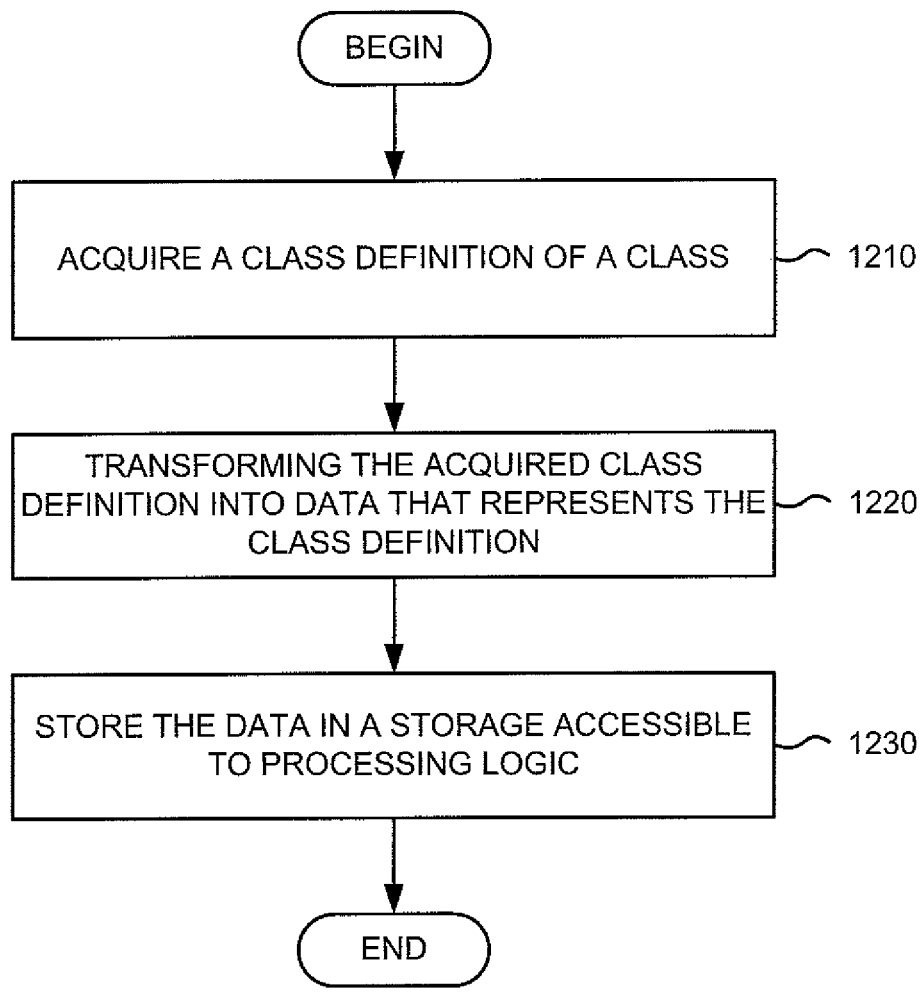
FIG. 12 illustrates a flowchart of a sequence of acts that may be used to process a class definition of a class, which is associated with an enumeration that enumerates one or more instances of the class.

A class definition may be associated with an enumeration that enumerates a list of one or more instances associated with a class. The class definition may contain a specification of one or more superclasses to which one or more instances belong. FIG. 12 illustrates a flowchart of example acts that may be used to process a class definition that is associated with (1) an enumeration that enumerates a list of one or more instances of a class and (2) a specification of one or more superclasses to which the one or more instances may belong.

Referring to FIG. 12, at block 1210 the class definition of a class is acquired. The acquired class definition may be associated with a specification of an enumeration that enumerates one or more instances of the class. The specification of the enumeration may enumerate a partial list of instances of the class. The class definition may also be associated (e.g., contain) a specification of one or more superclasses to which one or more of the instances belong. The class definition may contain one or more attributes that may be associated with one or more instances enumerated in the enumeration. An attribute may specify an access level of an instance.

Acquiring may include, for example, acquiring (e.g., reading, receiving, etc.) the class definition from a file, from a user, from a block diagram (e.g., a graphical block diagram), from a program configured to generate the class definition, from a network, from a remote system, and so on. The class definition may be specified in a graphical or textual form. Likewise, the enumeration associated with the class definition may be specified in a graphical or textual form. The enumeration may be external to the class definition and may be incorporated into the class definition using, for example, an "include" mechanism, such as a software directive. The external class definition may reside in, for example, a file, library, database, and so on.

The class defined by the class definition may be an enumeration class and the class definition may contain a first keyword that identifies the class as an enumeration class. The class definition may contain a second keyword that identifies the class definition as a class definition. The first keyword may be in parenthesis and follow the second keyword, such as described above.

The act at block 1220 may involve transforming the acquired class definition into data that represents the class definition. The data may be, for example, a parse tree, or some other intermediate form. The data may be a organized as a tree-like structure (e.g., hierarchical tree) containing nodes, such as described above, and may be stored in storage, such as a primary storage, secondary storage, etc.

At block 1230, the data is stored in a storage that is accessible to processing logic. The storage may be a primary storage, such as primary storage 230, or a secondary storage, such as secondary storage 270. The processing logic may include processing logic, such as described above with respect to processing logic 220.

For example, in an embodiment, computer program 340 includes class definition 800. The lexical analyzer 350 may acquire the class definition 800 by reading computer program 340. The lexical analyzer 350 may process the class definition 800 into a token stream. The parser 360 may generate an intermediate representation based on the token stream. The intermediate representation may be organized like intermediate representation 900. The metadata generator 380 may access the intermediate representation and generate metadata that represents the class. The metadata may include a META_CLASS node that indicates the class belongs to the superclass "LOGICAL".

The metadata may also include one or more META_ENUMERATED_ENTITY objects 1050 associated with an instance where each object 1050 contains an identifier associated with that instance. For example, the metadata may contain an object 1050 that contains the name "OFF" and may be associated with the instance "0". The metadata and intermediate representation may be generated and stored in storage, such as primary storage 230 and/or secondary storage 270.

Figure 13:
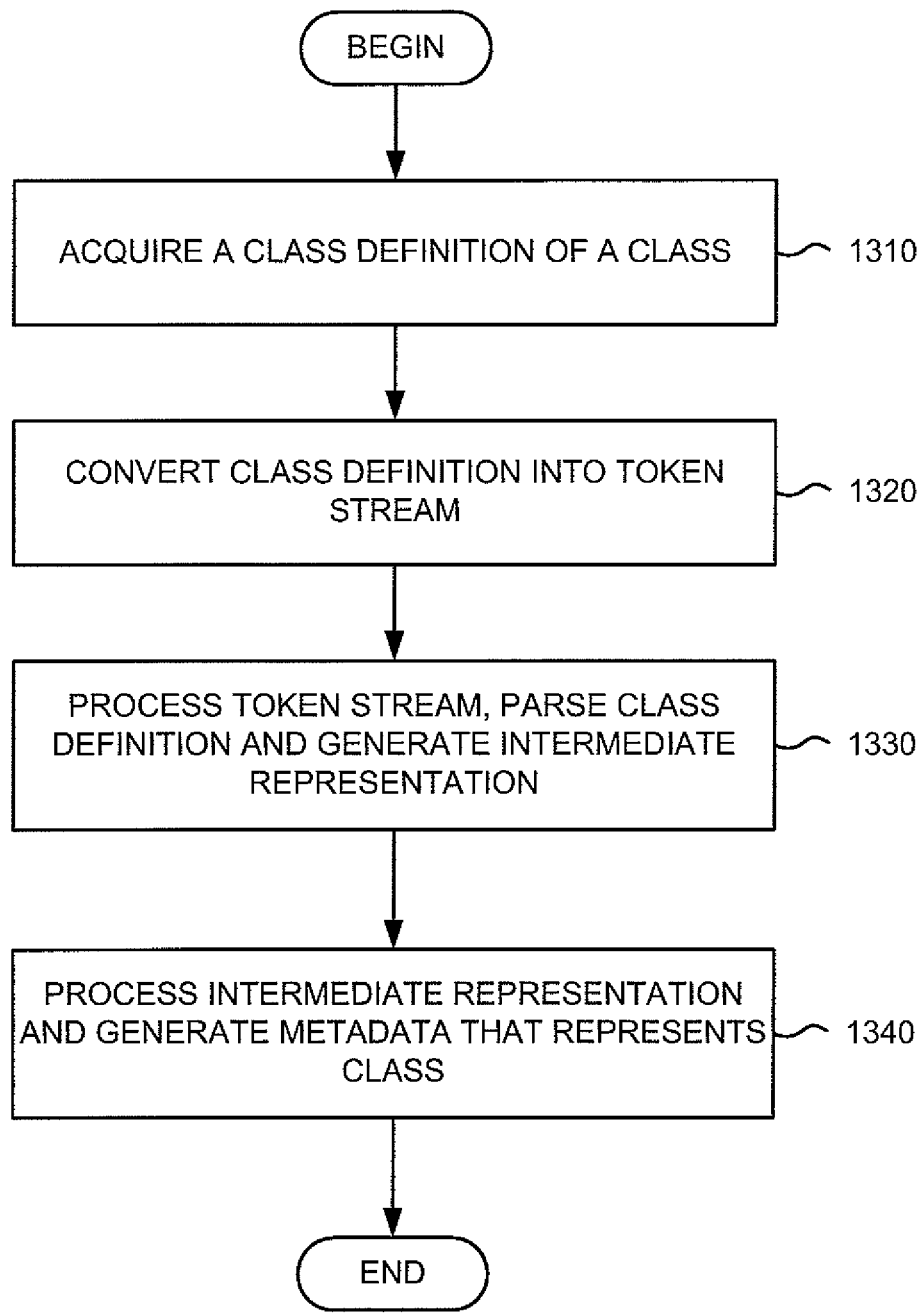
FIG. 13 illustrates a flowchart of a sequence of acts that may be used to process a class definition of a class that is associated with an enumeration and generate metadata to represent the class.

FIG. 13 illustrates a flowchart of example acts that may be used to process a class definition in accordance with an embodiment of the invention.

Referring to FIG. 13, at block 1310 the class definition is acquired. The acquired class definition may be associated with a specification of an enumeration that enumerates one or more instances of the class. The specification of the enumeration may enumerate a partial list of instances of the class. The class definition may also be associated (e.g., contain) a specification of one or more superclasses to which one or more of the instances belong. The class definition may contain one or more attributes that may be associated with one or more instances enumerated in the enumeration. An attribute may specify an access level of an instance. The class definition may be acquired as described above.

The class definition may be in a graphical or textual form. Likewise, an enumeration associated with the class definition may be in a graphical or textual form. Also as noted above, the enumeration may be external to the class definition and incorporated into the class definition using an "include" mechanism (e.g., a software directive). The external class definition may reside in, for example, a file, library, database, and so on.

At block 1320, the class definition is converted into a token stream. This act may involve recognizing lexemes in the computer program and converting the lexemes to tokens that are included in the stream. At block 1330, the token stream is analyzed, the class definition is parsed and an intermediate representation is generated. This act may involve (1) determining if the token stream contains allowable expressions and (2) generating a data structure based on the allowable expressions. The intermediate representation may be generated and stored in storage, such as a primary storage, a secondary storage, etc. The intermediate representation may be a parse tree.

At block 1340, the intermediate representation is processed and metadata that represents the class is generated from the intermediate representation. This act may include accessing the intermediate representation and generating metadata objects (such as objects 1020, 1030, 1040, and 1050) for various entities associated with the class that are represented in the intermediate representation.

For example, in an embodiment, computer program 340 contains class definition 800. Lexical analyzer 350 acquires the class definition 800 by reading the computer program 340. The lexical analyzer 350 generates a token stream that represents lexemes contained in the class definition 800. The lexemes may include, for example, "CLASSDEF", "ENUMERATION", "ONOFF", "LOGICAL", "OFF", "ON", etc. The token stream is input into the parser 360 which analyzes the token stream and generates an intermediate representation based on the token stream. The intermediate representation may be organized like intermediate representation 900. The intermediate representation may be generated and stored in primary storage 230 and/or secondary storage 270. The metadata generator 380 may access the intermediate representation and generate class metadata based on information contained in the intermediate representation. The metadata may likewise be stored in primary storage 230 and/or secondary storage 270.

The analysis may involve syntactical analysis of the token stream to determine if it contains allowable expressions. The allowable expressions may be used to create nodes and provide information associated with the nodes in the intermediate representation. For example, the token stream may contain one or more tokens that represent the keyword "ENUMERATION" illustrated at line 812. The parser 360 may analyze the one or more tokens, determine that they represent an allowable expression, create a node, such as node 930a, and initialize the node to indicate that it represents an enumeration block. In addition, the token stream may contain one or more tokens that represent the instance at line 814 that is identified as "OFF". The parser 360 may analyze these tokens, determine that they represent one or more allowable expressions associated with an instance in the enumeration and generate one or more instance nodes, such as node 940, to represent the declared instances. The parser 360 may then initialize the instance nodes to indicate that they represent instances, initialize attribute nodes with an identifier associated with the instance (e.g., "OFF", "ON", etc.) and an attribute node, such as node 950, with an argument list associated with the instance (e.g., "0", "1", etc.).

An enumeration class may be associated with a class constructor. In system 200, the class constructor may be automatically generated by the TCE 300 when a class definition for the class is processed. Here, a pointer to the class constructor may be included in an intermediate representation that may be generated to represent the class. The class constructor may be called from outside the class and may return an instance of the class associated with an argument list that is specified by the call and passed to the constructor.

Figure 14A:
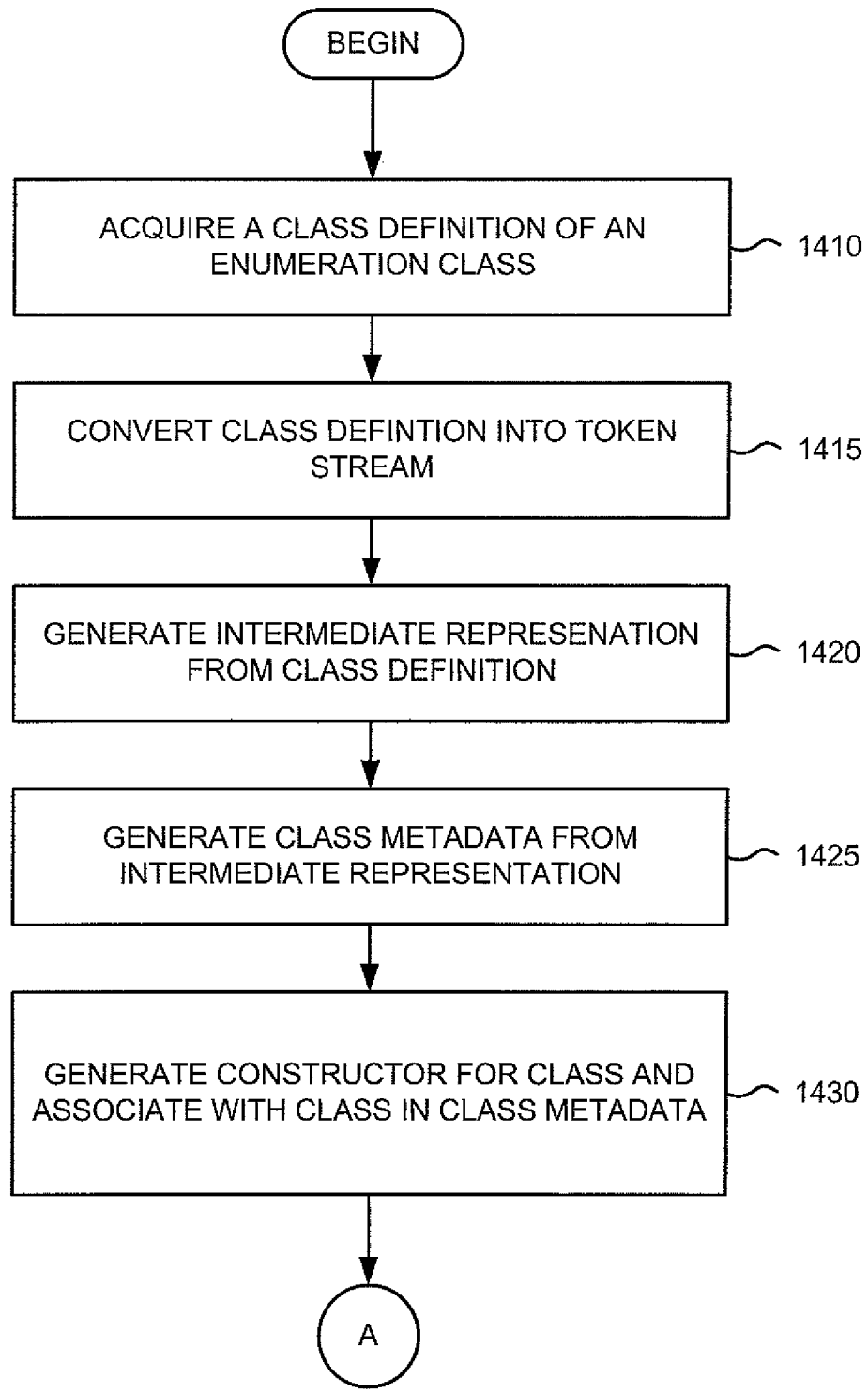
FIGS. 14A-B illustrate a flowchart of a sequence of acts that may be used to call a class constructor from outside of an enumeration class.
Figure 14B:
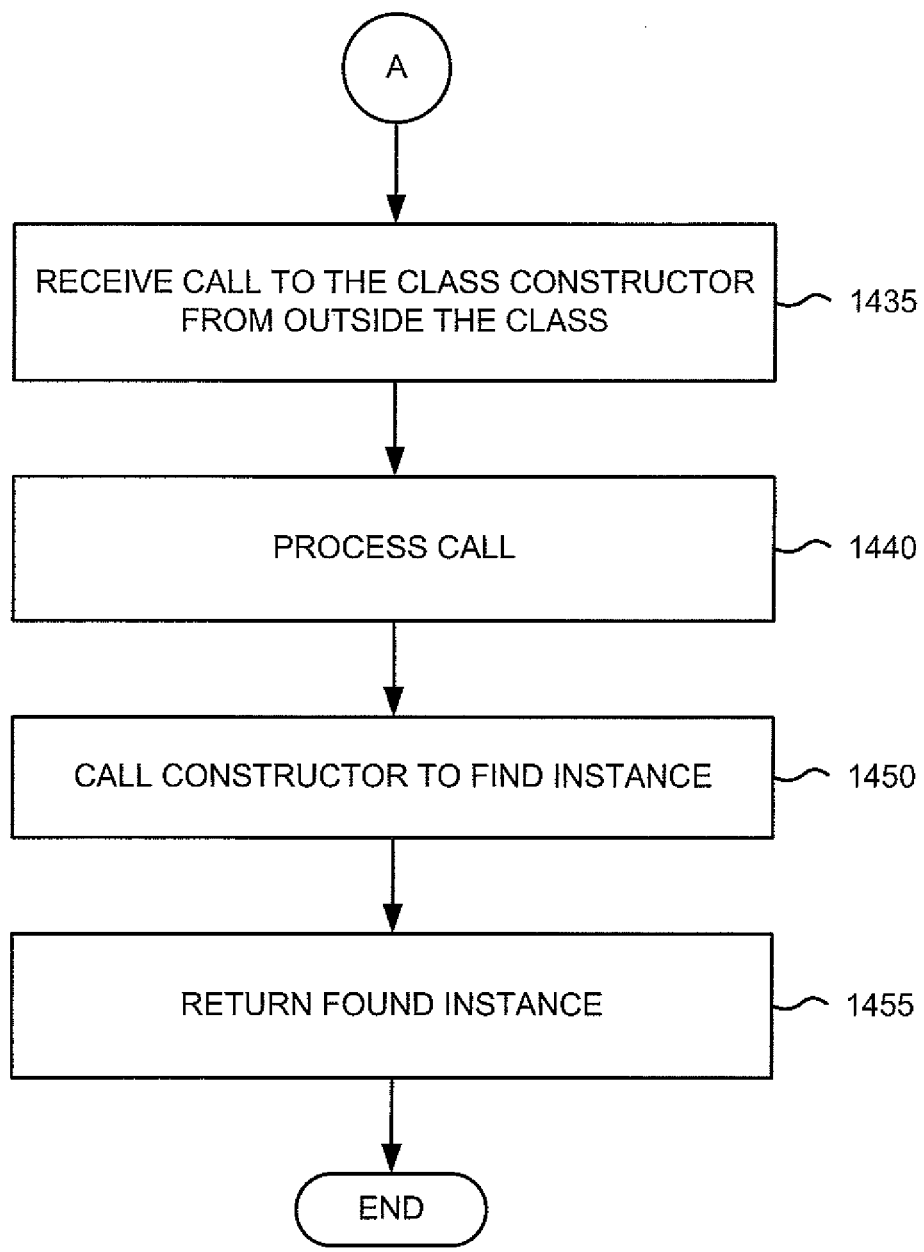

FIGS. 14A-B illustrate a flowchart of example acts that may be used to call a class constructor from outside of an enumeration class. In this example, the constructor returns an instance of the class specified by an argument list that is passed to the constructor.

Referring to FIGS. 14A-B, at block 1410, a class definition of an enumeration class is acquired. The class definition may be associated with an enumeration. As noted above, the enumeration may be externally defined. The enumeration may enumerate a partial list of instances of the class. The class definition may be acquired, as described above. At block 1415 the acquired class definition is converted to a token stream, as described above. At block 1420, an intermediate representation that represents the class is generated. This act may involve generating the intermediate representation based on the token stream, as described above. Moreover, the intermediate representation may be generated and stored in storage, such as a primary storage, secondary storage, etc.

At block 1425, metadata that represents the class is generated from the intermediate representation. The metadata may include metadata objects, as described above.

At block 1430, a constructor for the class defined by the class definition is generated and associated with the class. The constructor may be associated with the class using a metadata object, such as a META_METHOD object, described above. Note that the constructor may be generated and stored in storage, such as a primary storage, secondary storage, etc.

At block 1435 (FIG. 14B), a call is received to the class constructor from outside of the class. The call may include an argument list that may be used to identify an enumerated instance of the class. For example, a statement, such as statement 860 (FIG. 8) may be acquired (e.g., read) that calls the constructor from outside the class. The statement may include an argument list that may be used to identify the instance in the enumeration. The statement may be a command, a portion of code, etc. and may be read from a command line, data file, memory, etc. The argument list may include a value associated with the instance, an identifier associated with the instance, etc.

At block 1440, the call is processed. This processing may involve searching the metadata and identifying the enumerated instance of the class based on the argument list.

At block 1450, the constructor associated with the identified class is called to find the instance. The instance may be identified based on the argument list. Specifically, the constructor may search the metadata to identify an instance based on the arguments passed in the argument list. The search may involve comparing the arguments with arguments contained in argument lists associated with instances in the metadata to find the instance. The search may employ techniques such as indices or hash tables to quickly find an enumerated instance matching a given argument list.

At block 1455, the found instance is returned. The instance may be returned as a pointer to the instance, a handle associated with the instance, a copy of the instance, an identifier associated with the instance (e.g., a name), etc. If an instance is not found, an error may be issued.

For example, in an embodiment, computer program 340 contains class definition 800. The lexical analyzer 350 acquires the class definition 800 by reading computer program 340 and converts the class definition 800 to a token stream, as described above. The token stream is input into the parser 360 which generates an intermediate representation of the class definition, as described above. The metadata generator 380 generates metadata based on the intermediate representation, as described above. The TCE 300 may generate a constructor for the class and the metadata generator may represent the generated constructor in a metadata structure.

The statement at line 860 may be read and processed by the TCE 300. The TCE 300 processes the statement and based on the statement, the TCE 300 may call the constructor and pass an argument list containing "1" to the constructor. The constructor may access the metadata, identify an instance associated with the argument list and return the instance to the caller. The returned instance may be displayed, as illustrated at line 862.

It should be noted that two or more enumerations, as described above, can be compared to determine whether, for example, the two or more enumerations have the same number of instances, same order of instance, different argument lists associated with instances, and so on. Comparison may be accommodated through the use of checksum values. For example, checksum values may be generated for two enumerations based on the order of instances in the enumerations. The checksum values may be compared to determine if the enumerations are equivalent.

It should be noted other ways may be used to define and process an enumeration. For example, a utility, such as an editor, or other interface (which may be e.g., graphical, textual, etc.) may be used to define the enumeration (e.g., specify identifiers and/or argument lists associated with the instances, etc.) and other data structures that represent the enumeration may be generated based on interaction with the interface. The data structures could be later processed to process the enumeration.

As noted above, an enumeration associated with a class may be externally defined with respect to the class definition for the class. For example, enumeration 636 (FIG. 6) may be contained in an entity (e.g., a file, library, database, etc.) that does not include the class definition 600. Here, the class definition 600 may be configured to include the entity to incorporate the enumeration 636 into the class definition 600 using, as noted above, an "include" mechanism.

It should be further noted that acts associated with embodiments of the invention may be implemented by a computer system, such as computer system 200. For example, acts described above with respect to FIGS. 12, 13, and 14A-B, may be implemented in code that may be executed by processing logic 220.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described with regards to FIGS. 12, 13, and 14A-B, the order of the acts may be modified in other implementations. Further, non-dependent acts may be performed in parallel.

Also, the term "user", as used herein, is intended to be broadly interpreted to include, for example, a computer system (e.g., a workstation) or a user of a computer system, unless otherwise stated.

It will be apparent that embodiments, described herein, may be implemented in many different forms of software and/or hardware in the implementations illustrated in the figures. Software code and/or specialized hardware used to implement embodiments described herein is not limiting of the invention. Thus, the operation and behavior of the embodiments were described without reference to the specific software code and/or specialized hardware—it being understood that one would be able to design software and/or hardware to implement the embodiments based on the description herein.

Portions of the invention may be implemented as "logic" that performs one or more functions. This logic may include hardware, such as an application specific integrated circuit or a field programmable gate array, software, or a combination of hardware and software. The logic may be encoded in one or more executable media and may include instructions for execution by processing logic, such as processing logic 220.

It should be noted that one or more computer-readable media may store computer-executable instructions that when executed by processing logic, such as processing logic 220, may perform various acts associated with one or more embodiments of the invention. The computer-readable media may be volatile or non-volatile and may include, for example, flash memories, removable disks, non-removable disks, and so on.

It should be further noted that various electromagnetic signals, such as wireless signals, electrical signals carried over a wire, optical signals carried over optical fiber, etc., may be encoded to carry computer-executable instructions, configured to implement one or more embodiments of the invention, on a network, such as, for example, network 140.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   acquiring a class definition associated with a class,
      the class definition including:
         first information associated with an enumeration,
            the enumeration listing one or more instances of the class, and
         second information associated with one or more superclasses to which the one or more instances belong;
   transforming the class definition into a data structure that includes information associated with the class,
      transforming the class definition including:
         generating a plurality of tokens based on the first information and the second information,
         identifying, in the plurality of tokens, at least one token that corresponds to at least one allowable expression, and
         forming the data structure based on the at least one token;
   associating, respectively, at least one instance, of the one or more instances listed in the enumeration, with at least one identifier in the data structure;
   generating, based on the data structure, metadata associated with the enumeration;
   generating a constructor function for the enumeration,
      the constructor function being used to construct an instance of the class; and
   associating the constructor function with the metadata associated with the enumeration,
      the acquiring, the transforming, the associating the at least one instance, the generating the metadata, generating the constructor function, and the associating the constructor function being performed by one or more processors.

2. The method of claim 1, where acquiring the class definition includes:
   identifying the one or more instances based on one or more entities associated with the one or more superclasses.

3. The method of claim 1, where acquiring the class definition includes:
   identifying third information associated with the class definition,
      the third information identifying at least one of:
         a property associated with the class,
         a member function associated with the class, or
         an event associated with the class; and
   including the third information in the class definition.

4. The method of claim 1, where acquiring the class definition includes:
   acquiring data associated with an attribute for an instance, of the one or more instances of the class listed in the enumeration; and
   including the data in the class definition.

5. The method of claim 4, where acquiring the data associated with the attribute further includes:
   acquiring, as the data, third information relating to an access level associated with the instance.

6. A non-transitory computer-readable medium to store instructions, the instructions comprising:
   one or more instructions executable by at least one processor to:
      acquire a class definition of a class,
         the class definition including:
            first information associated with an enumeration,
               the enumeration identifying one or more instances of the class, and
            second information associated with one or more superclasses to which the one or more instances belong;
      transform the class definition into data that represents the class definition;
      store the data;

generate, based on the stored data, metadata associated with the enumeration;

generate a constructor function for the enumeration,
the constructor function being used to construct an instance of the class; and associate the constructor function with the metadata associated with the enumeration, the one or more instructions, to transform the class definition, further comprising:
at least one instruction to:
form a token stream based on the first information and the second information,
identify at least one token from the token stream, the at least one token corresponding to one or more allowable expressions, and
transform the class definition into the data based on the at least one token.

7. The non-transitory computer-readable medium of claim 1, where the one or more instructions, to transform the class definition, further include:
one or more instructions to associate, in the data, one or more identifiers with a particular instance of the one or more instances.

8. The non-transitory computer-readable medium of claim 1, where the one or more instructions, to store the data, further include:
one or more instructions to identify a data structure based on the class definition; and
one or more instructions to store the data in the data structure.

9. The non-transitory computer-readable medium of claim 1, where:
the one or more instances inherit one or more aspects of one or more entities associated with the one or more superclasses, and
the class definition further includes third information associated with the one or more entities.

10. The non-transitory computer-readable medium of claim 9, where the third information associated with the one or more entities further includes:
data associated with at least one of:
a property associated with a superclass of the one or more superclasses,
a member function associated with the superclass, or
an event associated with the superclass.

11. The non-transitory computer-readable medium of claim 1, where:
the enumeration relates to an attribute associated with the class,
the attribute is unrelated to one or more other classes, included in the one or more superclasses, that differ from the class, and
the class definition further includes:
third information associated with the attribute.

12. The non-transitory computer-readable medium of claim 11, where:
the attribute specifies an access level of an instance, of the one or more instances, associated with the class, and
the third information associated with the attribute includes:
data associated with the access level.

13. The non-transitory computer-readable medium of claim 1, where the class definition further includes:
a keyword that identifies the class as an enumeration class.

14. The non-transitory computer-readable medium of claim 13, where:
the keyword is a first keyword, and
the class definition further includes:
a second keyword that identifies the class definition.

15. The non-transitory computer-readable medium of claim 1, where the class definition further includes:
data associated with a member function that identifies a default instance, of the one or more instances, associated with the class.

16. The non-transitory computer-readable medium of claim 1, where the class definition further includes:
data identifying a default instance, of the one or more instances, associated with the class.

17. The non-transitory computer-readable medium of claim 1, where the instructions further comprise:
one or more instructions to associate the class with a block included in a graphical model.

18. The non-transitory computer-readable medium of claim 17, where the instructions further comprise:
one or more instructions to receive information specifying a parameter, associated with the class, using a graphical user interface (GUI) that is associated with the block.

19. The non-transitory computer-readable medium of claim 18, where the one or more instructions to receive the information specifying the parameter further include:
one or more instructions to receive data associated with at least one of:
an identifier associated with an instance of the one or more instances,
a value associated with the instance, or
an attribute associated with the instance.

20. The non-transitory computer-readable medium of claim 18, where the one or more instructions to receive the information specifying the parameter further include:
one or more instructions to receive data associated with at least one of:
a default instance associated with the class, or
an attribute associated with the class.

21. The non-transitory computer-readable medium of claim 18, where the instructions further comprise:
one or more instructions to display the GUI based on a selection of the block.

22. The non-transitory computer-readable medium of claim 1, where the one or more instances of the class, listed by the enumeration, include a partial list of instances of the class.

23. The non-transitory computer-readable medium of claim 1, where the one or more instances, listed by the enumeration, include a complete list of instances of the class.

24. The non-transitory computer-readable medium of claim 1, where the one or more instructions, to acquire the class definition, further include:
one or more instructions to acquire the class definition from at least one of:
source code associated with the class, or
object code associated with the class.

25. The non-transitory computer-readable medium of claim 1, where the one or more instructions, to acquire the class definition, further include:
one or more instructions to acquire at least one of:
a graphical form associated with the class definition, or
a textual form associated with the class definition.

26. The non-transitory computer-readable medium of claim 1, where the one or more instructions, to acquire the class definition, further include:
one or more instructions to acquire, as the first information, at least one of:
a graphical form associated with the enumeration, or
a textual form associated with the enumeration.

27. The non-transitory computer-readable medium of claim 1, where the one or more instructions, to acquire the class definition, further include:
one or more instructions to separately acquire the first information and the second information; and
one or more instructions to form the class definition based on the first information and the second information.

28. The non-transitory computer-readable medium of claim 1, where the one or more instructions, to acquire the class definition, further include:
one or more instructions to acquire the class definition from at least one of:
a file,
a block diagram, or
a program generating the class definition.

29. A system comprising:
a memory; and
a processor to:
acquire a class definition that defines a class,
the class definition including:
an enumeration listing one or more instances of the class, and
a specification of one or more superclasses to which the one or more instances belong,
transform the class definition into a data structure that includes information associated with the class,
store the data structure in the memory,
generate, based on the data structure, metadata associated with the enumeration,
generate a constructor function for the enumeration,
the constructor function being used to construct an instance of the class, and
associate the constructor function with the metadata associated with the enumeration,
the processor, when transforming the class definition into the data structure, being further to:
generate a plurality of tokens based on the enumeration and the specification,
identify, from the plurality of tokens, at least one token, each of the at least one token corresponding to at least one allowable expression, and
form the data structure based on the at least one token.

30. The system of claim 29, where:
the memory, storing the data structure, is a first memory, and
the processor is further to store the class definition in at least one of:
the first memory, or
a second memory that differs from the first memory.

31. The system of claim 29, where the processor, when transforming the class definition into the data structure, is further to:
associate, in the data structure, at least one instance, of the one or more instances listed in the enumeration, with at least one identifier.

32. A non-transitory computer-readable medium to store instructions, the instructions comprising:
one or more instructions executable by at least one processor to:
acquire a class definition that defines an enumeration class,
the class definition including information:
enumerating one or more instances of the enumeration class, and
specifying one or more superclasses to which the one or more instances belong;
generate, based on the class definition, a hierarchical data structure that includes a plurality of nodes;
store the hierarchical data structure;
generate, based on the hierarchical data structure, metadata associated with the enumeration class;
store the metadata;
generate a constructor function for the enumeration class,
the constructor function being used to construct an instance of the class; and
associate, in the stored metadata, the constructor function with the enumeration class,
the one or more instructions, to generate the hierarchical data structure, including:
at least one instruction to:
include, in the hierarchical data structure, a first node, of the plurality of nodes, that represents an attribute associated with the enumeration class,
include, in the hierarchical data structure, a second node, of the plurality of nodes, that represents a particular instance of the one or more instances, and
include, in the hierarchical data structure, a third node, of the plurality of nodes, that represents an identifier, in the class definition, that is associated with the particular instance represented by the second node.

33. The non-transitory computer-readable medium of claim 32, where the one or more instructions, to generate the hierarchical data structure, further include:
at least one instruction to:
generate a plurality of tokens based on the class definition,
identify, in the plurality of tokens, at least one token that corresponds to at least one allowable expression, and
generate the hierarchical data structure based on the at least one token.

34. The non-transitory computer-readable medium of claim 32, where:
the class definition relates to an attribute associated with the enumeration class,
the attribute is unrelated to one or more other classes, included in the one or more superclasses, that differ from the enumeration class, and
the class definition further includes:
data associated with the attribute.

35. The non-transitory computer-readable medium of claim 32, where the one or more instructions, to acquire the class definition, further include:
one or more instructions to acquire the class definition from at least one of:
source code associated with the enumeration class, or
object code associated with the enumeration class.

36. A non-transitory computer-readable medium to store instructions, the instructions comprising:
one or more instructions executable by at least one processor to:
acquire a class definition that defines an enumeration class,
the class definition including information:
enumerating one or more instances of the enumeration class, and
specifying one or more respective access levels associated with the one or more instances;
generate a hierarchical data structure based on the class definition,
the hierarchical data structure indicating the one or more respective access levels associated with the one or more instances;
store the hierarchical data structure;
generate, based on the hierarchical data structure, metadata associated with the enumeration class;
generate a constructor function for the enumeration class,
the constructor function being used to construct an instance of the class; and
associate the constructor function with the metadata,
the one or more instructions, to generate the hierarchical data structure, further including:
at least one instruction to:
include, in the hierarchical data structure, a first node that represents the access level for the one or more instances, and
include, in the hierarchical data structure, a second node that represents a particular instance of the one or more instances.

37. The non-transitory computer-readable medium of claim 36, where the one or more instructions, to generate the hierarchical data structure, further include:
at least one instruction to:
generate a plurality of tokens based on the class definition,
identify, in the plurality of tokens, at least one token that corresponds to at least one allowable expression, and
generate the hierarchical data structure based on the at least one token.

38. The non-transitory computer-readable medium of claim 36, where:
the class definition relates to an attribute associated with the enumeration class,
the attribute is unrelated to one or more other classes that differ from the enumeration class, and
the class definition further includes:
data associated with the attribute.

39. The non-transitory computer-readable medium of claim 36, where the one or more instructions, to acquire the class definition, further include:
one or more instructions to acquire the class definition from at least one of:
source code associated with the enumeration class, or
object code associated with the enumeration class.

40. A system comprising:
a memory; and
a processor to:
acquire a class definition that defines an enumeration class,
the class definition including information:
enumerating one or more instances of the enumeration class, and
specifying one or more superclasses to which the one or more instances belong,
generate, based on the class definition, a hierarchical data structure that includes a plurality of nodes,
store the hierarchical data structure in the memory,
generate, based on the hierarchical data structure, metadata associated with the enumeration class,
generate a constructor function for the enumeration class,
the constructor function being used to construct an instance of the class, and
associate, in the data structure, the constructor function with the metadata associated with the enumeration class,
the processor, when generating the hierarchical data structure, being further to:
include, in the hierarchical data structure, a first node that represents an attribute associated with the enumeration class,
include, in the hierarchical data structure, a second node that represents a particular instance of the one or more instances, and
include, in the hierarchical data structure, a third node that represents an identifier, in the class definition, that is associated with the particular instance represented by the second node.

41. The system of claim 40, where the processor, when generating the hierarchical data structure based on the class definition, is further to:
generate a plurality of tokens based on the class definition,
identify, in the plurality of tokens, at least one token that corresponds to at least one allowable expression, and
generate the hierarchical data structure based on the at least one token.

42. The system of claim 40, where:
the class definition relates to an attribute associated with the enumeration class,
the attribute is unrelated to one or more other classes, included in the one or more superclasses, that differ from the enumeration class, and
the class definition further includes:
data associated with the attribute.

43. A method comprising:
acquiring a class definition that defines an enumeration class,
the class definition including information:
enumerating one or more instances of the enumeration class, and
specifying one or more superclasses to which the one or more instances belong;
generating, based on the class definition, a hierarchical data structure that includes a plurality of nodes,
generating the hierarchical data structure including:
storing, in the hierarchical data structure, a first node that represents an attribute associated with the enumeration class,
storing, in the hierarchical data structure, a second node that represents a particular instance of the one or more instances;
storing the hierarchical data structure;
generating, based on the hierarchical data structure, metadata associated with the enumeration class;
generating a constructor function for the enumeration class,
the constructor function being used to construct an instance of the class; and associating, in the hierarchical data structure, the constructor function with the metadata associated with the enumeration class, the acquiring, the generating the hierarchical data structure, the storing, the generating the metadata, the generating the constructor function, and the associating being performed by at least one processor.

44. The method of claim 43, where generating the hierarchical data structure further includes:
  generating a plurality of tokens based on the class definition,
  identifying, in the plurality of tokens, at least one token that corresponds to at least one allowable expression, and
  generating the hierarchical data structure based on the at least one token.

45. The method of claim 43, where:
  the class definition relates to an attribute associated with the enumeration class,
  the attribute is unrelated to one or more other classes, included in the one or more superclasses, that differ from the enumeration class, and
  the class definition further includes:
    data associated with the attribute.

46. The method of claim 43, where acquiring the class definition includes:
  acquiring at least one of:
    a graphical form associated with the class definition, or
    a textual form associated with the class definition.

* * * * *

UNITED STATES PATENT AND TRADEMARK OFFICE
CERTIFICATE OF CORRECTION

PATENT NO. : 8,527,942 B2
APPLICATION NO. : 12/351621
DATED : September 3, 2013
INVENTOR(S) : David Foti et al.

Page 1 of 1

It is certified that error appears in the above-identified patent and that said Letters Patent is hereby corrected as shown below:

In the Claims:

Column 23, claim 7, lines 19-20, replace "medium of claim 1" with "medium of claim 6", Column 23, claim 8, lines 25-26, replace "medium of claim 1" with "medium of claim 6", Column 23, claim 9, lines 32-33, replace "medium of claim 1" with "medium of claim 6", Column 23, claim 11, lines 49-50, replace "medium of claim 1" with "medium of claim 6", Column 23, claim 13, lines 65-66, replace "medium of claim 1" with "medium of claim 6", Column 24, claim 15, lines 6-7, replace "medium of claim 1" with "medium of claim 6", Column 24, claim 16, lines 12-13, replace "medium of claim 1" with "medium of claim 6", Column 24, claim 17, lines 16-17, replace "medium of claim 1" with "medium of claim 6", Column 24, claim 22, lines 47-48, replace "medium of claim 1" with "medium of claim 6", Column 24, claim 23, lines 50-51, replace "medium of claim 1" with "medium of claim 6", Column 24, claim 24, lines 54-55, replace "medium of claim 1" with "medium of claim 6", Column 24, claim 25, lines 61-62, replace "medium of claim 1" with "medium of claim 6", Column 25, claim 26, lines 1-2, replace "medium of claim 1" with "medium of claim 6", Column 25, claim 27, lines 8-9, replace "medium of claim 1" with "medium of claim 6", Column 25, claim 28, lines 15-16, replace "medium of claim 1" with "medium of claim 6".

Signed and Sealed this
Twenty-ninth Day of October, 2013

Teresa Stanek Rea
*Deputy Director of the United States Patent and Trademark Office*